(12) United States Patent
Mifune

(10) Patent No.: US 7,301,662 B2
(45) Date of Patent: Nov. 27, 2007

(54) CONTROL SYSTEM AND CONTROL METHOD FOR IMAGE PROCESSING APPARATUS

(75) Inventor: Eiji Mifune, Hirakata (JP)

(73) Assignee: Kyocera Mita Corporation, Osaka (JP)

( * ) Notice: Subject to any disclaimer, the term of this patent is extended or adjusted under 35 U.S.C. 154(b) by 923 days.

(21) Appl. No.: 10/391,209

(22) Filed: Mar. 17, 2003

(65) Prior Publication Data

US 2004/0184069 A1    Sep. 23, 2004

(51) Int. Cl.
*G06F 15/00* (2006.01)
*G06K 1/00* (2006.01)

(52) U.S. Cl. .................................. 358/1.15; 715/769

(58) Field of Classification Search ............... 358/1.1, 358/1.9, 1.11–1.18; 715/769, 835
See application file for complete search history.

(56) References Cited

U.S. PATENT DOCUMENTS

| | | | | |
|---|---|---|---|---|
| 5,422,993 | A * | 6/1995 | Fleming | 715/835 |
| 5,546,527 | A * | 8/1996 | Fitzpatrick et al. | 715/769 |
| 6,134,017 | A * | 10/2000 | Schlank et al. | 358/1.15 |
| 6,453,132 | B2 * | 9/2002 | Ishikura | 399/81 |
| 6,469,796 | B1 * | 10/2002 | Leiman et al. | 358/1.15 |
| 6,976,224 | B2 | 12/2005 | Nii | |
| 2002/0021310 | A1 * | 2/2002 | Nakai et al. | 345/837 |

FOREIGN PATENT DOCUMENTS

| | | |
|---|---|---|
| JP | 7-325692 | 12/1995 |
| JP | 2000-181649 | 6/2000 |
| JP | 2000-181657 | 6/2000 |
| JP | 2000-305729 | 11/2000 |
| JP | 2000-332985 | 11/2000 |
| JP | 2002-084389 | 3/2002 |
| JP | 2003-084937 | 3/2003 |
| JP | 2003-241931 | 8/2003 |

* cited by examiner

*Primary Examiner*—Gabriel Garcia
*Assistant Examiner*—Thierry L. Pham
(74) *Attorney, Agent, or Firm*—Jordan and Hamburg LLP

(57) ABSTRACT

An image processing apparatus controlling system, control method and control program product for transferring to an image processing apparatus, document file or image data file in the form of electrical data, along with data of selected function of the image processing apparatus, and for making the image processing apparatus execute printing operation in accordance with received data.

A monitor screen of a terminal device such as a personal computer displays a printer icon 200EX composed of a plurality of parts 200A, 200B, . . . representative of the functions of the image processing apparatus to be selected. The monitor screen also displays file icons 210, 211, . . . along with the printer icon. A file icon representing an image processing apparatus to be used, is drugged and moved to any part of the printer icon 200EX and dropped there. Data of the function of the image processing apparatus represented by the part where the file icon is dropped, is transferred to the image processing apparatus along with the image data included in the selected file icon.

18 Claims, 17 Drawing Sheets

251

CONTROL SYSTEM AND CONTROL METHOD FOR IMAGE PROCESSING APPARATUS

BACKGROUND OF THE INVENTION

1. Field of the Invention

The present invention relates to a control system and control method for controlling an image processing apparatus such as a printer and a digital copier, by means of a terminal device such as a personal computer, a work station and a host computer, connected to the image processing apparatus through a network, and especially pertains to such a control system and a method wherein a data file including document file or image data in the form of electronic signal, is transferred to the image processing apparatus to make the image processing apparatus print the content of the data file, with functions of the image processing apparatus being specified.

2. Description of the Related Art

Recently, digital copiers are practically used which read out an original image by means of an image pick-up device such as a CCD, expose the surface of a photosensitive drum with laser beam bearing the read-out digital image data, develop with toner the latent image formed on the photosensitive drum, and transfer the developed image to a recording sheet. Such a digital copier has, in substance, combination of the functions of scanner and a printer, and may be interconnected, over a network, with a terminal device such as a personal computer, a work station, a host computer and the like, to be commonly used as a scanner or a printer in the network.

Such an image processing apparatus is provided with a printer driver software program (herein after referred to as a printer driver) which is adapted for various OS (Operating System) used by the terminal device. When the printer driver is installed in the memory of the terminal device, e.g. a hard disk drive of a personal computer, the image processing apparatus can be used as an output device in application software such as a word processor software and a spreadsheet software.

The conventional application software is provided with a one-click function for outputting, by a set, all the pages contained in a file data file which is currently being opened, when a printer icon is clicked. The software is also provided with a selection function with which the user pulls down a menu from a task bar and optionally selects, in accordance with predetermined process, pages and/or scope to be printed, a number of set of copies, size of copy sheet, an image processing apparatus to be used for the printing, and other optional functions of the apparatus, with the data of selected function being transferred to the image processing apparatus. It should be understood that document files and image data in electrical data to be controlled by the terminal device are generally referred to hereinafter as file data.

Meantime, if the file data controlled by the terminal device are outputted to a printer by the operation by means of a user-interface display screen of the terminal device, the copying operation will be efficient which, in conventional apparatus, are carried out by taking out an original from a file box and set it on a copier. To this end, as options for digital copier are provided an interface function for transmitting, to a terminal device, image data read by a scanner, and a data control software for controlling image data file on the terminal device.

As in the case of word processor software, a conventional image data control software is provided with one-click function with which, when an icon of a printer shown on a tool bar is clicked, all the pages included in the file image data file opened on the terminal device is printed by one set, by a printer which has been set on the terminal device, and a selection function wherein a user pulls down menus on the task bar and, in accordance with predetermined process, selects pages and region to be printed, a number of copies, size of printed sheet, a printer for executing the printing operation, optional functions of the printer.

However, the conventional software requires the user to operate pull down menus of multiple level hieralchy, navigating between different screens, when he/or she uses the software for the setting of optional functions of an image forming apparatus e.g. a digital copier, such as sorting function, duplex copying function, enlargement/reduction function, sheet designation (selection of size and/or quality of a sheet) function, staple function, punch function and the like. Thus, the conventional software has a problem of requiring troublesome operations.

In addition, when a single digital copier is connected in a network to be used as a printer, staple function is strongly required to positively use a staple function in order to make difference the user's copies from copies of image or document of other person. However, when the staple functions are selected with a conventional image data control soft, it is difficult to know where the staple will be put. Accordingly, the users have been reluctant in using the staple function.

According to a questionnaire survey made within the company of the applicant of the present patent application, only one set of copies are taken for 90% of document outputted to the printer, and more than one copies are printed so often. Accordingly, it is desirable that operation is as simple as possible when the user takes one set of copies.

SUMMARY OF THE INVENTION

An object of the present invention is to provide a control system for controlling an image processing apparatus by mean of a terminal device with simple operation system for controlling an image processing apparatus.

Another object of the present invention is to provide a method for controlling an image processing apparatus by means of a terminal device with the method being used to control an image processing apparatus with simple operation.

Yet another object of the present invention is to provide a program product to be installed in a terminal device for controlling an image processing apparatus by mean of the terminal device with simple operation.

Further object of the present invention is to provide a control system for an image processing apparatus which is simple in operation for making the image processing apparatus execute printing operation with the functions or features of printing being designated by means of the terminal device and file data being transferred to the image processing apparatus.

Still further object of the present invention is to provide a method for controlling an image processing apparatus which is simple in operation for making the image processing apparatus execute printing operation with the functions or features of printing being designated by means of the terminal device and file data being transferred to the image processing apparatus.

Yet further object of the present invention is to provide a program product to be installed in a terminal device for controlling an image processing apparatus and which is simple in operation for making the image processing apparatus execute printing operation with the functions or features of printing being designated by means of the terminal device and file data being transferred to the image processing apparatus.

To attain one or more of the objects as mentioned above, according to one aspect of the present invention, a control system for an image processing apparatus for outputting image data wherein an image data controlled by a terminal device is outputted to an image processing apparatus having a function optionally selected by a user, and an image is formed on a recording sheet in accordance with the function selected by the user, the control system comprising a file icon display for displaying, on a monitor screen of the terminal device, file icons representing at least parts of image data files controlled by the terminal device; a printer icon display for displaying, on the monitor screen, a printer icon composed of a plurality of parts representative of functions which are selectable for the image processing apparatus; a pointer moving unit for moving a pointer on the monitor screen in response to user's operation on an input device of the terminal device; a file icon moving unit for moving a file icon pointed by the pointer, following the movement of the pointer when the pointer points the file icon out of file icons displayed on the monitor screen, and at the same time a switch of the input device is being turned on; and an image data output unit for outputting image data represented by the pointed icon along with data of setting of the function corresponding to the part of the printer icon where the switch of the input device is turned off with the pointed file icon being overlapped with the part of the printer icon.

In the above mentioned control system for an image processing apparatus, it is preferable that a plurality of terminal devices are connected with at least one image processing apparatus.

In addition, it is also preferable that the control system for an image processing apparatus further comprises a printer function retrieving unit for retrieving a function of the image processing apparatus optionally selectable by the user and storing data of the selected function in the terminal device at the time when the image processing apparatus is electrically connected with the terminal device.

It is also preferable that a control system for an image processing apparatus further comprises a printer state retrieving unit for retrieving the current state of the image processing apparatus, and that the printer icon display is arranged to change the appearance of the printer icon displayed on the monitor screen, in accordance with the retrieved state of the image processing apparatus.

According to an aspect of an embodiment of the present invention, the printer icon display is arranged to display a plurality of printer icons respectively representing the image processing apparatus connected to the terminal device via the network bus.

According to another aspect of the embodiment of the present invention, the printer icon display is arranged to display a plurality of printer icons in difference shapes in accordance with the kinds of the image processing apparatus.

According to yet another aspect of the embodiment of the present invention, the image processing apparatus includes a scanner function, and the control system further comprises an image data control unit for transferring the data of image read by the image processing apparatus, to a terminal device designated by the user, and controlling the transferred image data as one of the image data files.

According to still another aspect of the embodiment of the present application, the file icon display is arranged to display, as the file icon, a thumbnail image of a first page of the image data file read by the image processing apparatus.

According to further aspect of the embodiment, the function of the image processing apparatus to be optionally selected by the user, includes at least one of sorting function, duplex copy function, stapling function, punching function, saddle stitch function, enlarge/reduction copy function, and sheet designation function.

According to another aspect of the present invention, an image processing apparatus control system is adapted for transferring a file data which is being edited with an application software activated in a terminal device, to an image processing apparatus having functions which can be optionally selected by a user such that the image processing apparatus forming an image on a recording sheet in accordance with the transferred file data and the function selected by the user. The control system comprises a first printer icon display unit for displaying a first printer icon on a monitor screen of the terminal device; a pointer moving unit for moving a pointer on the monitor screen of the terminal device in response to operation of input device by the user; a second printer icon display unit for displaying a second printer icon by pulling-down from the first printer icon when the pointer points at the first printer icon displayed on the monitor screen, the second printer icon being composed of a plurality of parts representative of functions of the image processing apparatus to be selected by the user; and a file data outputting unit for outputting, to the image processing apparatus, a file data which is being edited, and data of a function setting corresponding to the part of the second printer icon which is pointed at by the pointer with a switch of the input device being turned on.

In the control system mentioned above, it is preferable that a printer function retrieving unit is provided for retrieving functions of the image processing apparatus to be selected by the user and storing the data of the retrieved functions at the time when the image processing apparatus is connected with the terminal device.

It is also preferable that a printer state retrieving unit is provided for retrieving current state of the image processing apparatus and changing appearance of the first or second printer icon in accordance with the retrieved state.

According to an aspect of the invention, the first printer icon display unit is arranged to display icons respectively representing a plurality of image processing apparatus interconnected with the terminal device via a network bus.

With respect to such display of the plurality of icons, it is also preferable that the first printer icon display unit is arranged to display icons in different shapes in accordance with kinds of the image processing apparatus.

According to an embodiment of the invention, the first printer icon display unit is arranged to display the first printer icon on a task bar displayed on the monitor screen.

Although the present invention has been described as a control system for controlling an image processing apparatus, the invention may be in the form of method for controlling the image processing apparatus or a program product to be installed in a terminal device for that control.

As mentioned above, a digital copier functions as a network printer and scanner besides the coping function inherent to the copier. Thus, it should be understood that the term "image processing apparatus" are generally used for the apparatus having such functions within a single apparatus or in combination. Accordingly, the image processing apparatus included not only digital copiers but also network scanner, laser beam printers and ink-jet printers connected in a network.

Those and other objects, advantages and novel features of the present invention will more fully appear from the following detailed description when the same is read in connection with accompanying drawing. It is to be expressly understood, however, that the drawing is for purpose of illustration only and is not intended as definition of the limits of the invention.

DETAILED DESCRIPTION OF PREFERRED EMBODIMENTS

Explanation will be made herein after about embodiments of the present invention with reference to accompanying drawing.

Figure 1:
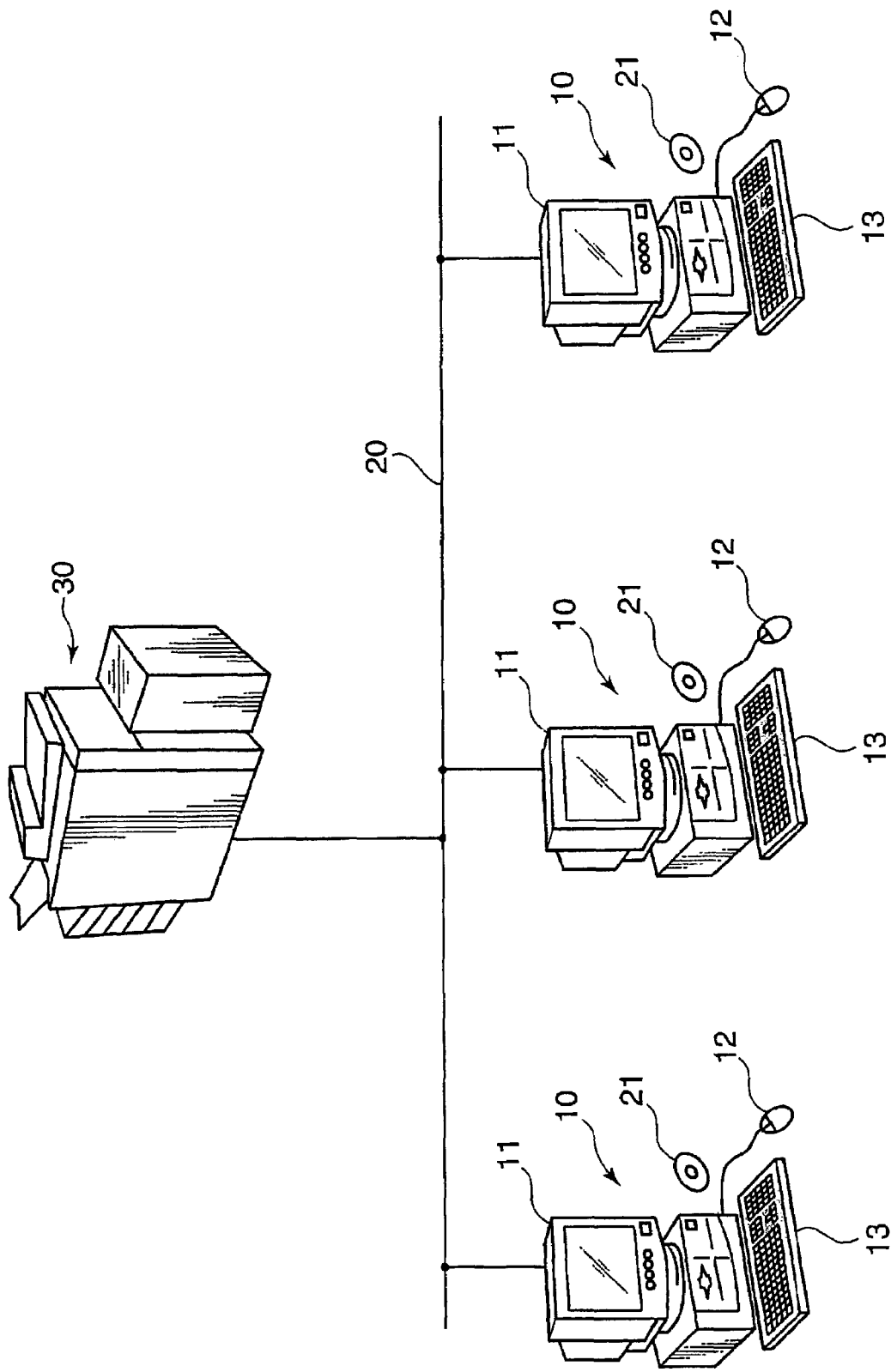
FIG. 1 illustrates a exemplary configuration of a LAN to which the control system for an image processing apparatus according to a first embodiment of the present invention is applied.

FIG. 1 shows a LAN (Local Area Network) to which the embodiment is applied. A plurality of personal computers 10 as representatives of the terminal devices, are interconnected via a network bus 20 to an image processing apparatus 30 such as a digital copier which functions as an output device. It is to be understood that the embodiments will be described with reference to the personal computer, but that the personal computer may be replaced by other terminal device such as a work station and a host computer.

When the digital copier is used as the image processing apparatus 30, the digital copier reads, by a scanner, the image of an original put on a original support, exposes the surface of a photosensitive drum by laser beam or LED bearing the data of the read image, develops, with toner, the latent image formed on the photosensitive drum, and forms an image on a recording sheet by transferring the developed image. Thus, the digital copier has combined functions of a scanner and a laser beam printer known as peripheral devices. Besides those functions, the digital copier 30 is provided with optional functions, well-known per se, inherent to a copier, such as sorting function, duplex copying function, enlarge/reduction copying function, designation of sheet (size and/or quality of sheet), stapling function, and punching function.

In addition, as an additional option for the digital copier 30 is provided a image data control program in the state stored in a memory media such as CD-ROM 21. The program is designed to output the image data read by the scanner, to a memory media such as a floppy disk drive or CD-R drive, to transfer the image data via the network bus 20 to any of the personal computers designated by the user, and to transmit, via the network bus 20 to the digital copier 30, an image data selected by the user from image data controlled by the personal computer 10 such that the digital copier 30 forms or prints an image on a recording sheet. The image data control program can be used if the user who has bought the copier, installs, in his or her personal computer 10, the image data control program recorded in the CD-ROM 21.

Figure 2:
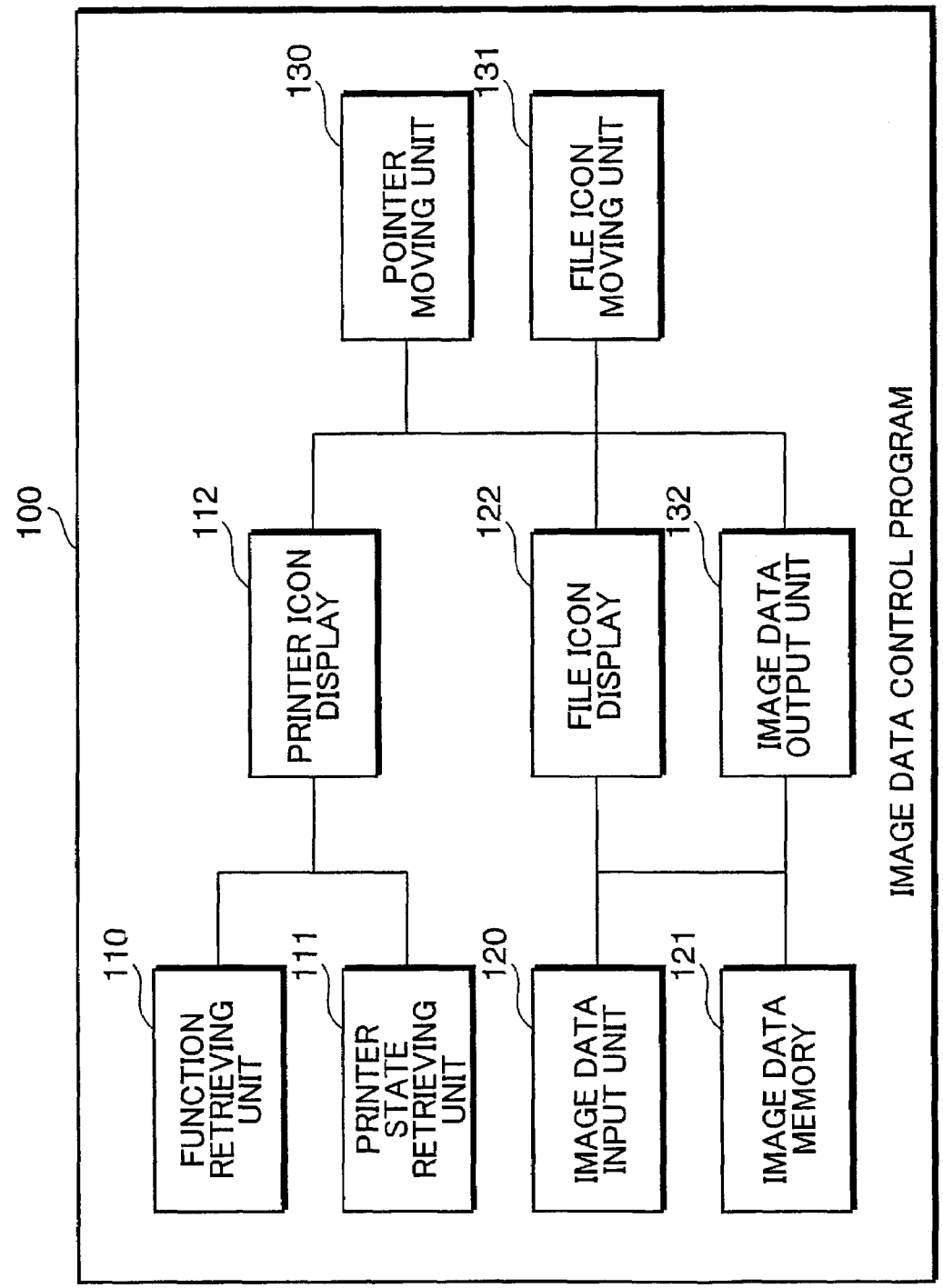
FIG. 2 is a block diagram showing function blocks of image data control program of the embodiment.

FIGS. 2 through 9 show an image data control program according to the first embodiment of the present invention. FIG. 2 shows configuration of the function blocks of the image data control program of the embodiment. The image data control program 100 is composed of units for making the personal computer 10 perform the functions as explained herein after, when the program 100 is installed and initiated in the personal computer 10.

A function retrieving unit 110 accesses a CPU of the image processing apparatus 30 connected via the network bus 20, to read out the kind of the image processing apparatus and functions provided in the image processing apparatus, especially the functions optionally selected by the user, and output the read-out data to a printer icon display 112 and others.

A print condition retrieving unit 111 is connected via the network bus 20 to an image processing apparatus 30 which operates as a printer. The print condition retrieving unit 111 accesses a CPU of the image processing apparatus 30 to detect the current status of the image processing apparatus 30 such as for example, printing is ongoing (busy), print is available (ready), shortage of toner, toner has been run out, sheet is jamming (jam), and lack of sheet, out-of-order of the apparatus, and inform the detected result to a printer icon display 112 and others.

In accordance with the retrieved information from the function retrieving unit 110, the printer icon display 112 selects from a plurality of printer icons prepared in advance and stored in a memory, an icon corresponding to the kind of the image processing apparatus 30 connected via network bus 20 to the personal computer, such as for example, a digital copier, a laser beam printer, ink-jet printer, or the like, and displays the selected icon on the monitor screen 11 of the personal computer 10. At this time, in order to enable selection of a plurality of functions, the printer icon display unit 112 displays an printer icon composed of a plurality of parts when the image processing apparatus 30 is provided with optional functions to be selected by the user and is provided any optional functions. The printer icon display 112 also displays current status of the image processing apparatus 30 in a predetermined manner in accordance with the detected result informed by the printing condition retrieving unit 111. The printer icon will be described in more detail later.

A image data input unit 120 is connected to the network bus 20 via an interface, to receive image data transferred from the image processing apparatus 20 connected to the network bus 20, and store the image data in a image data memory 121. In the case where the image processing apparatus is a digital copier, the digital copier has image scanning function with which an image is read by the digital copier and read image data itself may be stored and controlled by the personal computer 10 as a digital image data.

The image data memory 121 is a recording device such as a hard disk drive or a MO drive built-in or associated to the personal computer to store, in a predetermined format, document file prepared or created by means of word processor software, image data file of the pictures taken by a digital camera, image date file of the image read by the digital copier 30. It should be understood that the term "image data" includes such all kinds of data relating to the document file and image data file.

A file icon display 122 displays, on the monitor screen 11 of the personal computer 10, document data file and/or image data file stored in the image data memory 121, with the display being made in the format in accordance with storing format of each file. For example, in the case of document files prepared by means of a word processor software, the file icon display 122 displays a schedule of document file names each composed of characters of predetermined number, or a set or series of icons of a predetermined shapes with the document file names. In the case of image data files of pictures taken by a digital camera, the image data is thinned to create thumbnail images which are displayed in a set or series. Further, in the case of image data files of the images read by a digital copier 30 or other image reading apparatus such as a image scanner, thumbnail images of the read images are produced and displayed when the number of page of each read image is one, while thumbnail images of first pages are produced and displayed when the number of page is more than one.

A pointer moving unit 130 moves a pointer such as a cursor on the monitor screen in accordance with input operation by means of a mouse 12, a track pad, a track ball or keyboard 13 which function as input device of the personal computer 10.

When the user operates the mouse 12 or the like to register the pointer with a particular file icon, and turns on a switch associated with the mouse 12 (for example a switch operated by clicking the left side button of the mouse 12), a file icon moving unit 131 changes the color of the file icon to indicate that a document file or image file corresponding to the icon has been selected. The file icon moving unit 131 causes a file icon designated by the pointer on the monitor screen 11 to move following the icon when the user makes a drug operation, i.e., operates the mouse 12 or the like to move the pointer keeping the mouse associated switch at on-state. When the mouse associated switch is turned off, the designated icon is displayed at a position where the mouse associated switch is turned off.

An image data output unit 132 determines whether the position of the pointer at the time when the mouse associated switch is turned off, coincides with the printer icon or with a predetermined scope of area around that position, i.e., whether the designated file icon has been moved to the position of the printer icon. When it is determined that whether the designated file icon has been moved to the position of the printer icon, the image data output unit 132 reads out from the image data memory 121, a document file or image data corresponding to the designated file icon, and transfers the read-out data to an image processing apparatus corresponding to the printer icon.

Further, in the case where the image processing apparatus 30 selected by the user is a digital copier provided with functions to be optionally selected by the user, the printer icon corresponding to that image processing apparatus 30 is composed of a plurality of parts corresponding to the selectable functions. In that case, the image data output unit 132 determines which part of the printer icon coincides with the pointer at the position when the mouse associated switch is turned off. At that time, the printer icon display 112 change the color or other appearance of the portion of the printer icon where the pointer is positioned when the mouse associated switch is turned off. Then, along with the image data, the image data output unit 132 transfers data of setting of the function of the image processing apparatus indicated by the position of the pointer at the time of turning off of the mouse associated switch, such as, for example, a function of sorting, duplex copy, saddle stitching copy, enlarged or reduced copy, usage of a staple, punching by a puncher, designation of size and quality of copy sheets, a set number of copies, an so forth.

In the case where selectable functions are many, it is possibly difficult to distinctly discern the part corresponding to a selected function on the printer icon. In that case, the printer icon display 112 may be designed such that a small printer icon is initially displayed on the monitor screen 11, and that a large printer icon will be displayed by balloon, as the pointer approaches the printer icon.

Still further, when further designation is necessary for a selected function, such as the position of stable or punch, the ratio of enlargement or reduction of copied image, size of sheet, number of sheets, display is made for the further designation for the selected function, by mean of the printer icon display 112, when the mouse associated switch is turned off with the pointer being at an area representing the selected function. After the user makes the further designation, such as the position of stable or punch, the ratio of enlargement or reduction of copied image, size of sheet and/or number of sheets, the image data output unit 132 transfers, to the image processing apparatus 30, the data of the selected and designated function or functions along with the image data.

Figure 3:
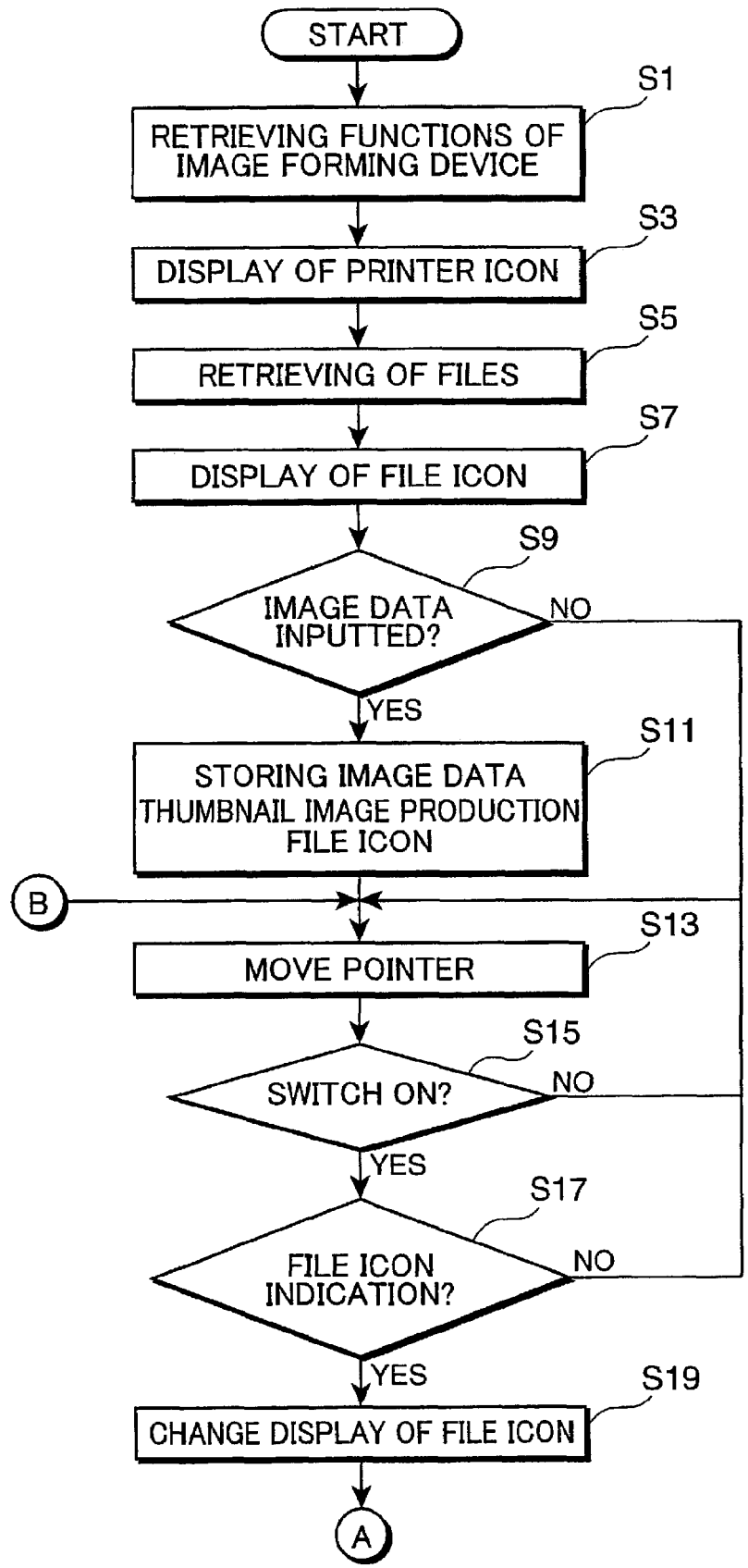
FIG. 3 is a flowchart showing an operation of the image data control program of the embodiment.
Figure 4:
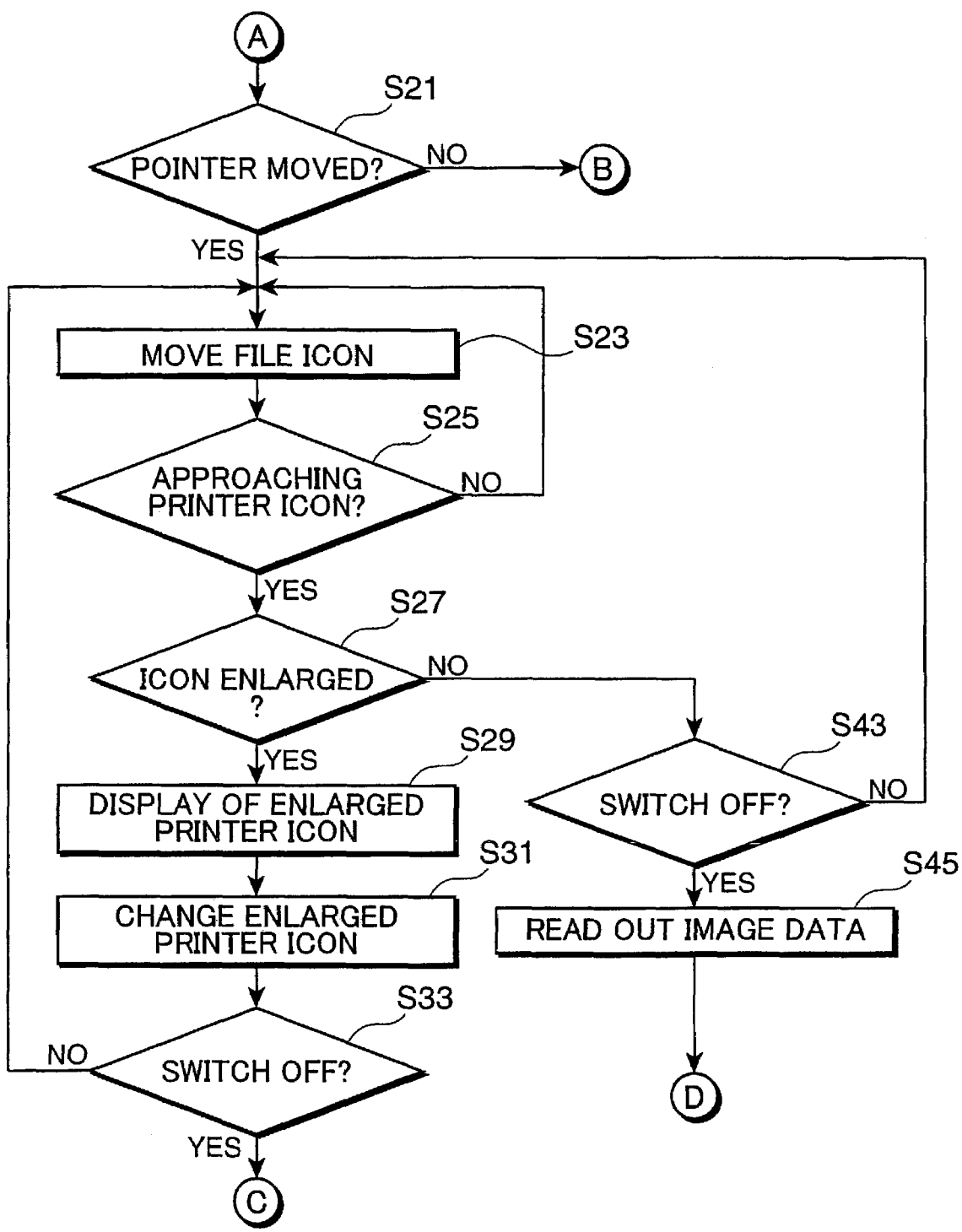
FIG. 4 is a continuation of the flowchart shown in FIG. 3.
Figure 5:
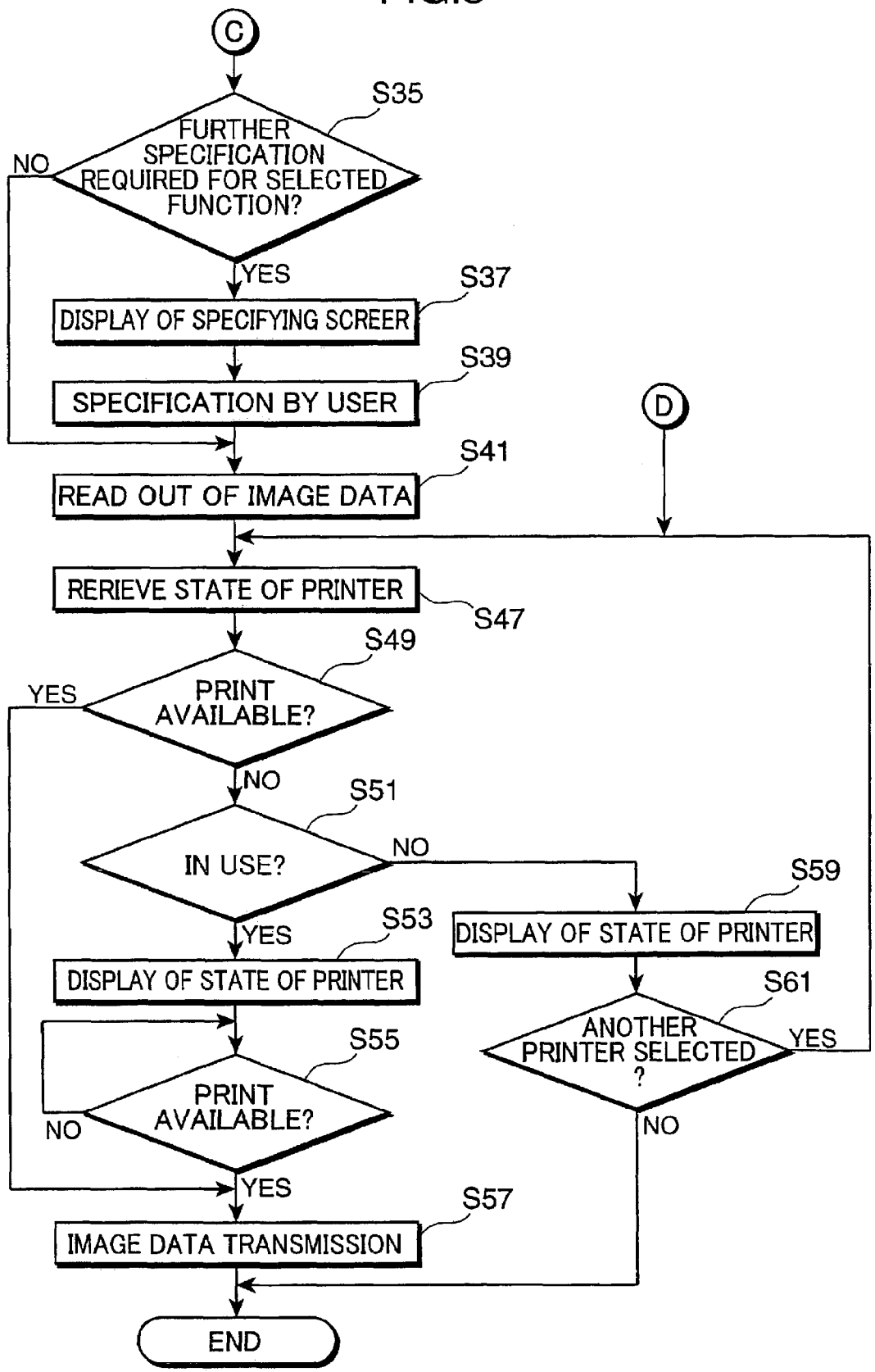
FIG. 5 is a continuation of the flowchart shown in FIG. 4.

Next, the operation of the image data control program according to an embodiment of the present invention will be described with reference to flow chart shown in FIGS. 3 through 5 and to screen display shown in FIGS. 6 through 9. In the following description, it is assumed that a digital copier is used as the image processing apparatus 33, with the digital printer functioning as a printer for executing printing operation in accordance with the command from a personal computer 10 as a representative of a terminal device.

When the image control program installed in the personal computer 10 is initiated, the function retrieving unit 110 connected to the network bus 20 retrieves the function of a digital copier of which power switch has been turned on, especially the optional functions to be selected by the user at his or her will. (Step 1) Then, the printer icon display 112 selects a printer icon according to the functions provided in the digital copier 30, in accordance with the retrieval by the function retrieving unit 110, and displays the printer icon on the monitor screen 11. (Step S3)

Following or in parallel with those operations, the file icon display 122 retrieves document files and image files stored in the image data memory 121. (Step S5) Then the file icon display 122 displays in series or set, on the monitor screen 11, a schedule of document file names or icons of predetermined format, e.g. icons of predetermined shapes including the file names, thumbnail images, and the like. (Step 7)

The image data input unit 120 determines, at predetermined timings, whether image data read by means of the scanner function of the digital copier is transferred from the digital copier via the network bus to the personal computer 10 (Step S9). When the image data is transferred, the image data input unit 120 stores the image data as an image data file in the image data memory 121. In addition, the file icon display 122 creates thumbnail image from the received image data and additionally displays on the monitor screen 11, the created thumbnail image as a file icon. (Step S11)

Figure 6:
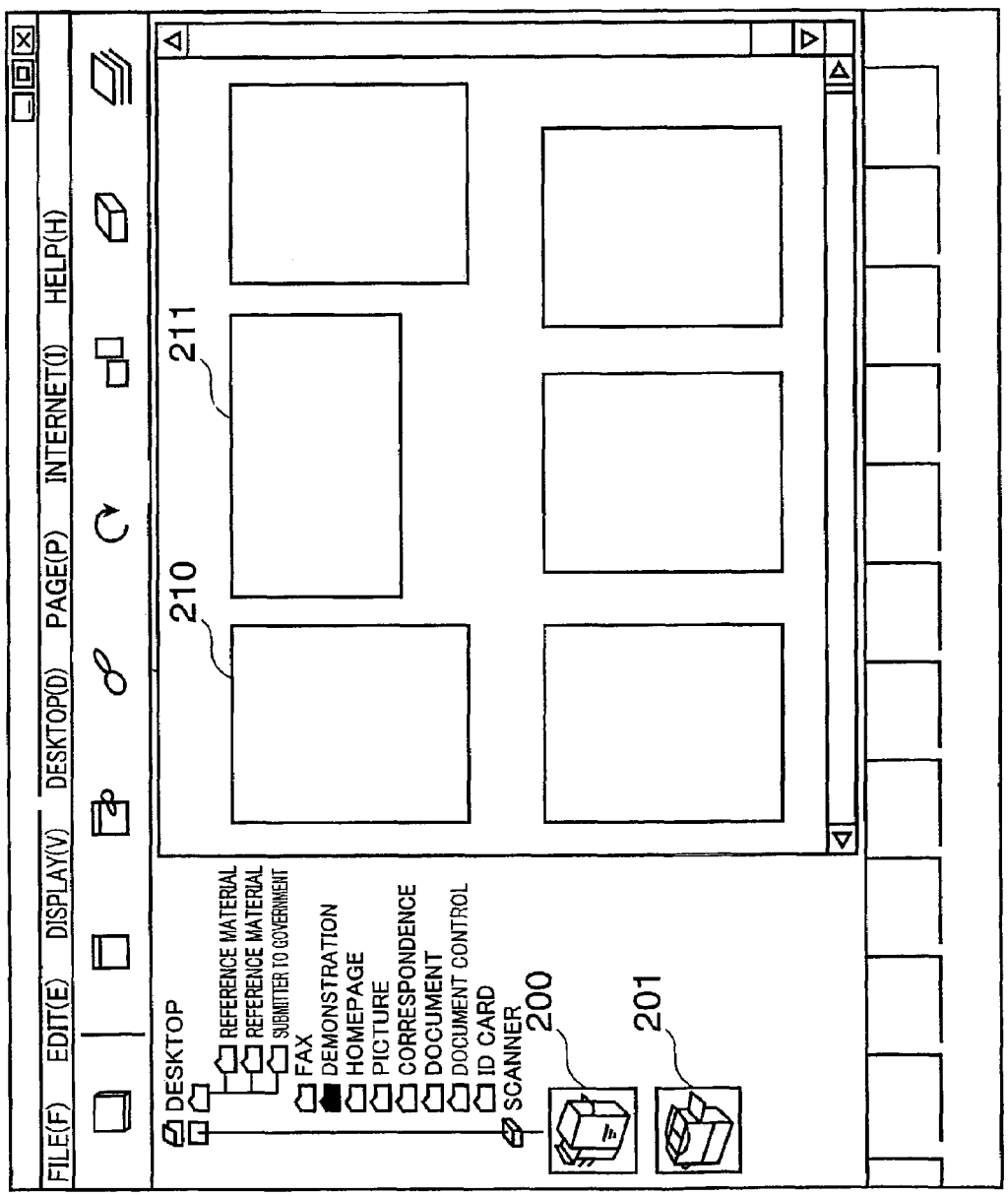
FIG. 6 shows an exemplary display of file icons and printer icons at the time when the image data control program is initiated.

FIG. 6 shows an example of the monitor screen 11 where the printer icons and file icons are displayed. Tool bars are displayed on the top and bottom of the screen. Folders and printer icons 200 and 201 are arranged along the left side edge of the screen. In the remaining area of the screen are displayed, in series, thumbnail images of image data files read by the scanner, as file icons 210, 211 and so forth. The printer icon 200 represents the digital copier and has a shape resembling the outer appearance of the digital copier. The printer icon 201 represents, for example, a laser beam printer and has a shape resembling the outer appearance of the laser beam printer.

If the user operates the input device such as the mouse 12, a pointer moving unit 130 displays a pointer 220 (see FIG. 7) on the monitor screen, and moves the pointer 220 in response to input signals. (Step S13) A file icon moving section 131 determined whether a switch associated with the mouse 12 is turned on or not. (Step S15) When the mouse associated switch is turned on, it is determined whether the position of the pointer at the time when the switch is turned on, designates any of the file icons 210, 211. (Step S17) If the pointer 220 fails to designate any of the file icons (NO at Step S17), the turning-on operation of the switch is invalidated. On the other hand, if the pointer 220 designates any of the file icons (YES at Step S17), the file icon display 122 changes the appearance of the designated icon, for example changes the color of the icon, to indicate the user which file icon has been selected. (Step S19)

Figure 7:
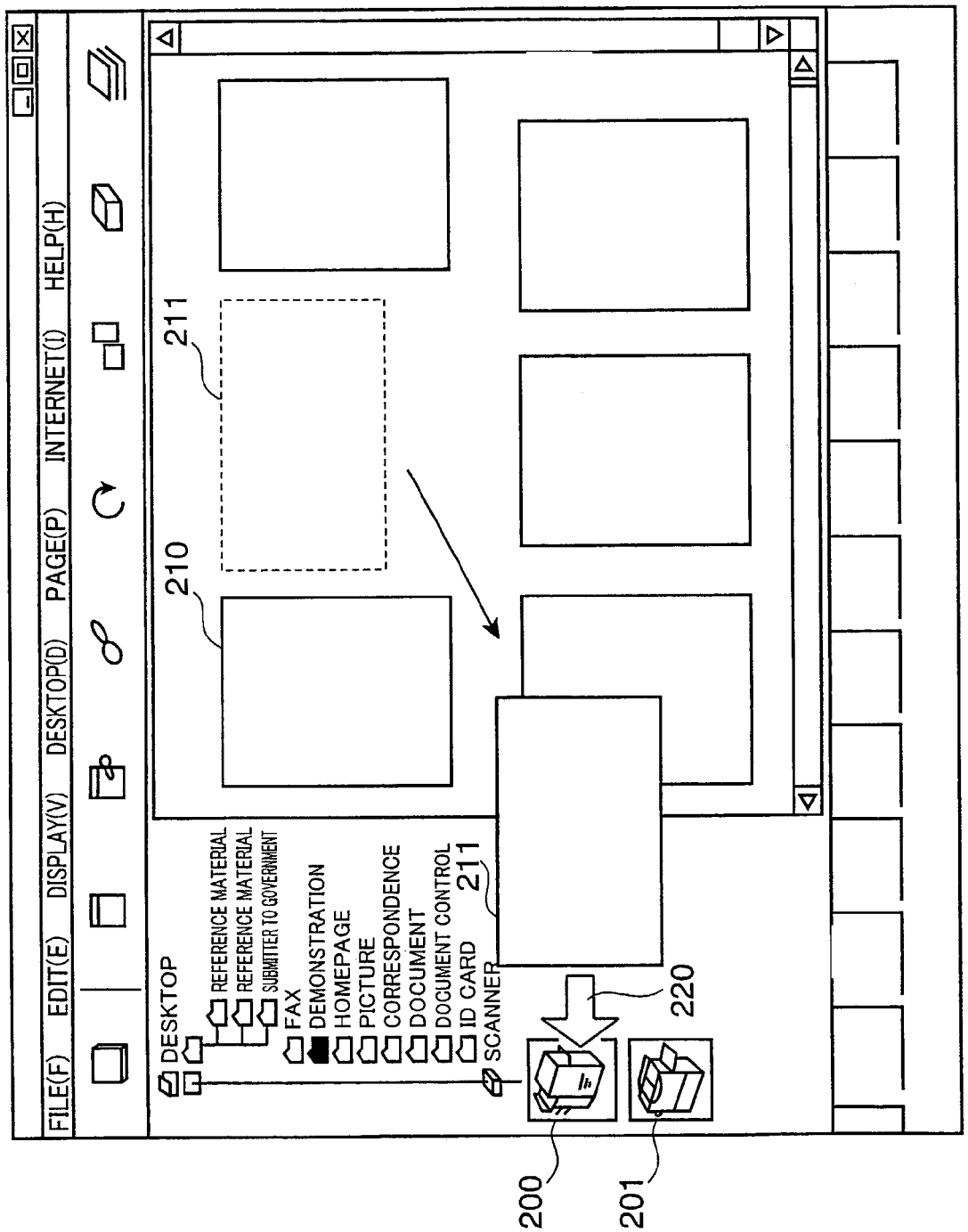
FIG. 7 shows an exemplary display of the file icon in motion.

When the file icon 211, for example, is designated or selected, the file icon moving section 131 determines if the mouse associated switch has been kept at on-state, and if the pointer 220 is being moved. (Step S21) When the pointer 220 is being move with the mouse associated switch being kept at on-state, the file icon moving unit 131 calculates the current position of the pointer 220 on the monitor screen 111, and move the designated file icon 211 to follow the pointer 220 as shown in FIG. 7.

Figure 8:
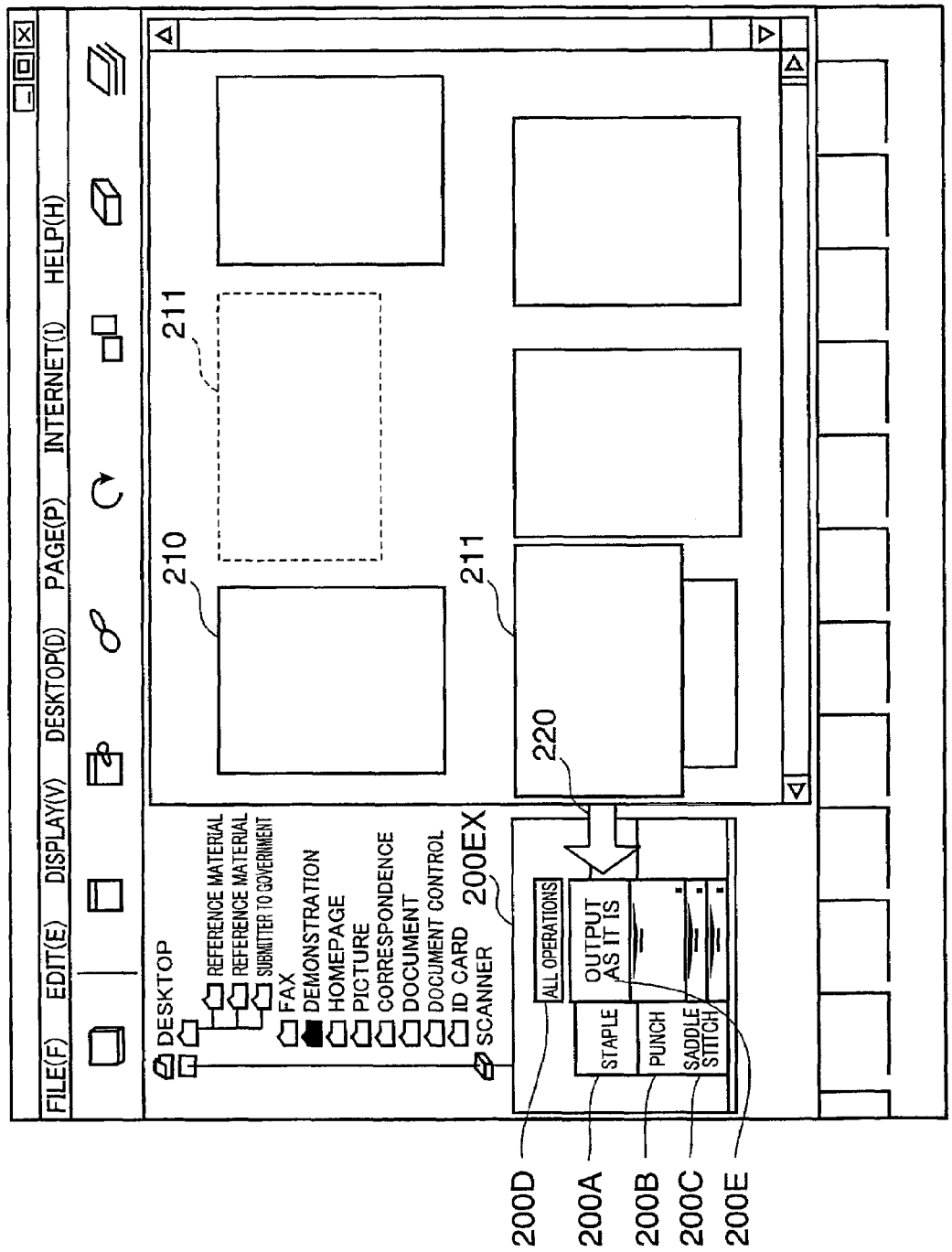
FIG. 8 shows an exemplary display of an enlarged printer icon.

The file icon moving unit 131 and/or the printer icon moving unit 112, determines if the pointer 220 approaches any printer icon. (Step S25) When it is determined that the pointer 220 approaches a certain printer icon (for example the printer icon 220), it is further determined if the approached printer icon requires enlarged display or not. (Step S27) In the case the enlarged display is required, the printer icon display 131 displays an enlarged printer icon 200EX on the monitor screen 11 as shown in FIG. 8. (Step S29)

As shown in FIG. 8, the printer icon 200EX is composed of a plurality of parts corresponding to optional functions provided in the digital copier 30. In the example shown in FIG. 8, the printer icon 200EX includes parts representing optional functions besides the as-it-is output part 200E for printing each page in the image data, by one sheet without using stapler function and other optional function. The parts representing optional functions, include a staple part 200A, a punch part 200B, a saddle stitching part 200C, and all operation part 200D for the designation of every function of the copier 30.

The printer icon display 112 changes the appearance of the enlarged printer icon 200EX by, for example, changing the color of the part designated by the tip of the pointer 220. (Step S31)

Next, the printer icon display 112 and the image data output unit 132 determines if the mouse associated switch has been turned off, i.e., if the file icon 211 drugged by the user has been dropped on the printer icon 200EX. (Step S33) When it is determined that the mouse associated switch has been turned off, the printer icon display 112 determines if the function selected by the user requires further designation following the selection of the function, such as designation of the position of staple or punch, the size or ration to be enlarged or reduced, size of copying sheet, number of sets of the prints. (Step S35)

Figure 9:
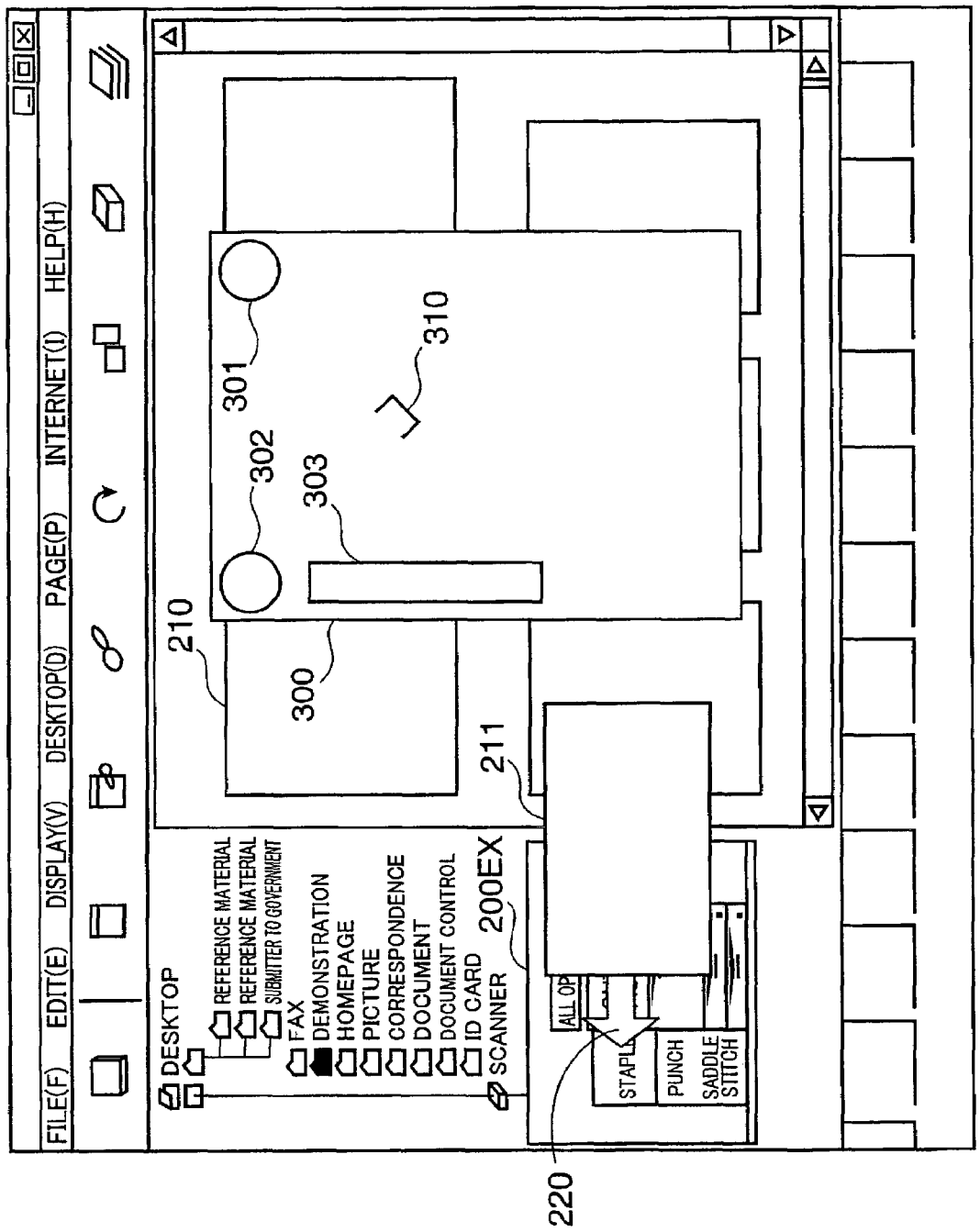
FIG. 9 shows an exemplary display of a screen for designating stapling position.

When the further designation is required, the printer icon display 112 displays a screen for the designation in accordance with the function selected on the monitor screen 11. (Step S37) FIG. 9 shows a screen for the designation of the position of staple as an example. In regard to the example shown in FIG. 9, display is made, on the monitor screen 11, of a picture 300 of a recording sheet indicating selectable positions 301, 302 and 303 for the stapling. At this time, the pointer 310 has a shape of a needle of the stapler to indicate that the monitor screen is for designating a position of a sheet to be stapled.

When the user designates the position to be punched or stapled, size or ratio to be enlarged or reduced, a size of a sheet, and/or the number of sets of copies, (Step S39), the image data output unit 132 read out from the image data memory 121, data such as the image data corresponding to the designated file icon. (Step S41)

On the other hand, if it is determined at Step S35 that the selected function does not requires further designation, the image data output unit 132 read out, from the image data memory 121, data such as image data corresponding to the designated file icon. (Step S41)

If the printer icon does not require to be enlarged at Step S35, the image data output unit 132 determines if the mouse associated switch has been turned off. (Step S43) If it is determined that the mouse related switch has been turned off, the image data output unit 132 read out, from the image data memory 121, data such as image data corresponding to the designated file icon. (Step S45)

In ordinary cases, when the personal computer transfers the image data to the digital copier 30 via the network bus 20, the digital copier executes printing operation in accordance with the data and functions designated by the user, while the digital copier is at an available condition. However, the digital copier can be used in a plurality of ways, such as, as a scanner, copier and printer, it is possible that other user may use the designated copier. In addition, if the copier is used very frequently, it is not rare that the copier does not work because of shortage of toner, lack of toner, sheet jam, lack of sheet, or out-of-order of the copier.

Accordingly, a printing condition retrieving unit 11 accesses CPU of the digital copier connected to the personal computer via the network bus 20, and retrieves the current condition of the digital copier 30 (Step S47) to determine if print is available or not. (Step S49) If print is unavailable, the printing condition retrieving unit 111 determines if the designated digital copier is being under service or not. (Step S51) If it is determined that the digital copier is being used, the printer icon displays 112, indicates current status of the copier, i.e., it is being used by another user, by, for example, superimposing, on the printer icon, letters showing "under service", changing the color of the printer icon, or turning on and off the display of the printer icon. (Step S53) At that time, the personal computer waits until the copier become available condition. (Step S55)

In the case the copier 30 is available at Step S49 or the copier 30 becomes available at Step S55, the image data output unit 132 transfers, via the network bus 20 to the copier 30, the image data read at Step S41 or S45 along with the data of the functions selected at Step S39, data regarding to designation or data set in advance, (Step S57) and terminates the flow.

In the case when the copier 30 is not being used at Step S30, the printer icon display 112 displays, on the monitor screen 11, the current state of the copier, i.e., the state of our-of-order, for example, by superimposing, on the printer icon, letters showing "our-of-order" or other state, changing the color of the printer icon, or turning on and off the display of the printer icon. (Step S59) The state of the copier 30 to be indicated, may be either shortage of toner, lack of toner, sheet jam, lack of sheet, or out-of-order, and the display may be made in accordance with that state of the copier. Then, it is determined if the use selected other copier or image processing device. (Step S61) When another copier or image processing apparatus has been selected, the flow returns to Step S47 and the flaw as describe above is executed in connection with the newly selected copier or other image processing apparatus. If no other copier nor image processing apparatus has been selected, the flow is terminated at that stage.

As to an example of color of the icon for the indication of various states of the copier 30, the color may be green for the indication that printing is available, yellow for the indication that print is available but finishing might be not satisfactory for example due to shortage of toner, and red for the indication that printing can not be made.

Although the first embodiment of the present invention has been described with reference to the communication between a personal computer and a digital copier which is provided with combined functions of a scanner and a laser beam printer, besides the ordinary functions as a copier. The personal computer may receive the image data from a scanner. Also, instead of the digital copier, a laser beam printer or a ink-jet printer may be employed for the monitoring of printing operation availability and for the execution of printing operation in accordance with the data set on the personal computer. The terminal device for the setting is not limited to the personal computer but other various terminal devices, such as a work station, a host-computer and a server may be used instead.

According to the image data control system of the embodiment of the present invention as described above, when the user makes a drug and drop operation, a file is selected from the ones displayed in a set on the monitor screen, and printing is made with the optional functions provided on the image processing apparatus being made use of. As the result, the manner of printing of the image data may be selected by selecting one or more functions from a plurality of functions, by simple operation.

If a printer function retrieving unit is provided for retrieving available function of an image processing apparatus upon connection of the image processing apparatus with a terminal device such as the above mentioned personal computer, and for storing the retrieved function in a memory of the terminal device, the user may be released from manually setting of optional functions available with a new image processing apparatus which is newly introduced. If the program for the control of the image processing apparatus is designed to retrieve the optional functions of the image processing apparatus upon initiation of the terminal device, only the image processing apparatus and optional functions available at that time will be displayed by printer icons.

When the printer icon display is arranged to change, in accordance with the state of the image processing apparatus, the appearance of the printer icons displayed on the monitor screen, the user may be informed of the current state of the image processing apparatus such as whether printing is available or not, whether the printer is in use and requires to wait, whether printing can not be make due to lack of toner, lack of copy sheet, paper jam, or out-of-order of the apparatus, or that printing is available but the user is required to be careful with the printed copy because of shortage of toner.

When the printer icon display is arranged to display icons of a plurality of image processing apparatus connected to the terminal device via the network bus, use may select a desired one of the image processing apparatus connected to the network bus, in accordance with his or her purpose.

When the printer icon display is arranged to display different shapes of printer icons in accordance with the types or kinds of the image processing apparatus, the user may identify the types or kinds of the image processing apparatus and their optional functions only by taking a look at the printer icons.

When the image processing apparatus is arranged to have a scanner function with which the image data read by the image processing apparatus is transferred to the terminal device designated by the user, with the terminal device including a image data input unit for controlling the received image data as one of image data files, the image data read by means of the image processing apparatus may be controlled as electrical data in the terminal device.

If the file icon display is arranged to display thumbnail images of first pages of image data files when the image data files read by the image processing apparatus, the content of the files are visually recognized without opening the files.

If the function or functions to be optionally selected by the user includes one of sorting function, duplex copy function, staple function, punch function, saddle stitching function, enlarge/reduction copy function, and sheet designation function, the user may make use of a function which is generally employed in a digital copier as optional function, and, for example, the user may take copies with the copied sheet being automatically stapled, so that office work may be more efficient. Further, a conventional digital copier may used for a plurality of purposes, resulting in saving space equipped by the office equipments and reduction in the cost of the apparatus.

Next, description will be made about method for outputting a file data print in accordance with a second embodiment of the present invention with reference to FIG. 10 through 17.

The LAN (Local Area Network) to which the file data output method according to the present embodiment, may be substantially the same as that of the first embodiment described with reference to FIG. 1.

A digital copier 30 as an image processing apparatus, is additionally provided with a printer driver in the form stored in a recording media such as a CD-ROM, to installed in each terminal device such as a personal computer 10 such that the digital copier-30 may be used as a printing device and various optional function of the digital copier may be utilized.

When the user who bought the digital copier, installs the printer driver stored in the CD-ROM, in a hard disk drive of each personal computer, the digital copier 30 can be used as a printing device for the personal computer 10.

Further, added to the printer driver is a file data print output program which is add in the application software initiated in the personal computer and output the file data which is being edited on the application software, to an image processing apparatus which has functions to be optionally selected by the user, so that an image is formed on a recoding sheet in accordance with the functions selected by the user.

Figure 10:
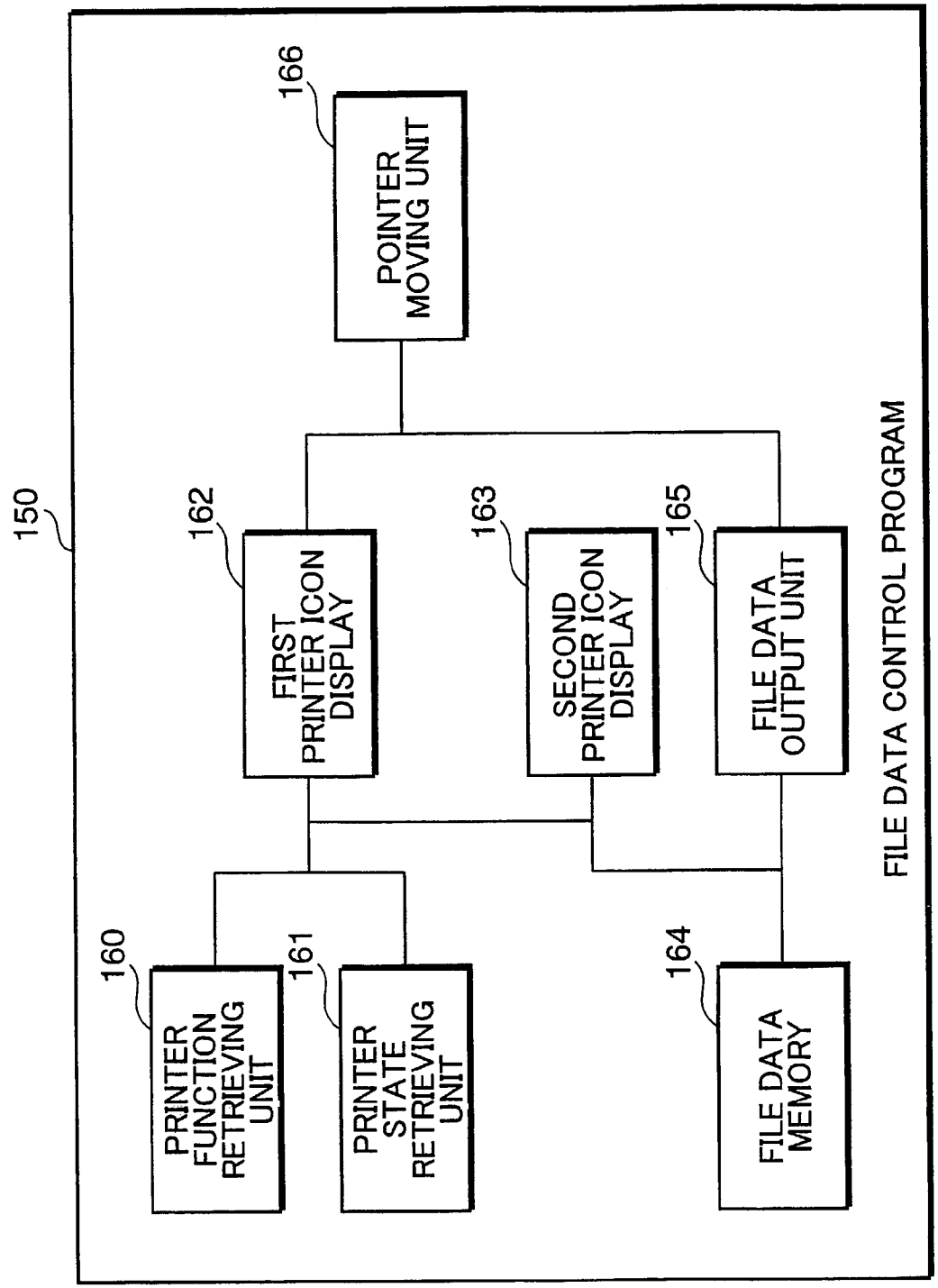
FIG. 10 is a block diagram showing function blocks of a file data print output program according to a second embodiment of the present invention.

FIG. 10 shows function blocks of the file data print output program according to the embodiment. The file data print output program 150 is composed of parts to make the personal computer 10 operate as a functioning part having various functions, when the file data print output program 150 is installed in the personal computer and is initiated.

A printer function retrieving unit 160 accesses a CPC of an image processing apparatus 30 provided with a printing function, such as a digital copier, a laser printer or an ink-jet printer, which is connect via a network bus 21 to the personal computer 10, reads out data of the kind of the image processing apparatus and the functions provided in the image processing apparatus, especially the functions to be optionally selected by the user, and outputs the read-out data to a second printer icon display 163.

A printer state retrieving unit 165 accesses the CPU of the image processing unit 30 connected to the personal computer 10 via the network bus, to detect the current state of the image processing apparatus 30, for example, printing is on-going (busy), print is available (ready), shortage of toner, toner has been run out, sheet is jamming (jam), lack of sheet, out-of-order of the apparatus, and inform the detected result to the first printer icon display 162 and second file icon display 163.

In accordance with the information of retrieved printer state supplied from the printer function retrieving unit 160, the fist file icon display 162 selects, from a plurality of icons prepared in advance and stored in a memory, a icon corresponding to the kind of the image processing apparatus 30 interconnected to the personal computer via a network bus 20, e.g. a digital copier, a laser beam printer or an ink-jet printer. After the selection, the printer function retrieving unit 160 additionally displays, on the monitor screen of the personal computer, the selected icon as a first printer icon on a task bar for an application software which has been initiated, such as a word processor software or a spreadsheet software. In the case, a plurality of image processing apparatus are connected to the network bus 20, a single icon may be displayed as a first printer icon representing an image processing apparatus previously selected as a main printer output device, or icons of all selectable image processing apparatus may be displayed.

A pointer moving unit 166 moves a pointer such as a cursor on the monitor screen in response to the input by means of a mouse 12 or keyboard 13 which operates as an input device for the personal computer 10.

The second printer icon display 163 displays a second printer icon composed of a plurality of parts, as a pulled down menu of the first printer icon such that the optional function may be selected, in the case when the point indicates a first printer icon representing a image processing apparatus having an optional function to be optionally selected by the user. The second printer icon may be designed to make the pull down display when the pointer simply points at the first printer icon, or when a predetermined switch of an input device such as a click switch of a mouse, is turned on.

The first printer icon display 162 and the second printer icon display 163 respectively display, in a predetermined manner, the current state of the image processing apparatus in accordance with the data of retrieved result, from the printer state retrieving unit 161. Each of the printer icons will be described in more detail later.

A file data memory 164 represents a memory device such as a hard disk drive and/or MO which are built-in the personal computer 10 or coupled to the personal computer on its outside. The file data memory 164 stores, in a predetermined format, document file prepared or created by means of word processor software, image data file of the pictures taken by a digital camera, image date file of the image read by the digital copier 30 or a scanner. It should be understood that the term "file data" includes such all kinds of data relating to the document file and image data file.

A file data output unit 165 determines whether the position of the pointer at the time when the switch associated with the mouse or other input device (referred to a mouse associated switch) is turned on, coincides with any portion of the first printer icon or second printer icon or falls in the area of a predetermined scope around either icon, i.e., determines which image processing apparatus and what function are selected. Then, the file data output unit 165 reads out from the file data memory 114, a file data such as of the document file under edition, or image data, and transfer the read-out file data, via the network bus 20, to the image processing device corresponding to the icon pointed by the pointer.

As described above, when the image processing apparatus selected by the user is an apparatus such as a digital copier which is provided with one or more functions to be optionally selected by the user, the second printer icon corresponding to that image processing apparatus is composed of a plurality of parts representative of the selectable functions. In that case, the file data output unit 165 determines in which portion or part of the second printer icon, the pointer resides when the mouse associated switch is turned on. At that time, the second printer icon display 163 changes the appearance such as a color of the portion or part of the second file icon where the pointer resides. When the mouse associated switch is turned on, the setting of the function corresponding to the position of the pointer at the time when the mouse associated switch is turned on, is transferred to the image processing apparatus 30 along with the file data. The setting of the function may be such as use of sorter, duplex copy, saddle stitching, enlarge or reduced copy, use of staple, punching by a puncher, designation of copy sheet e.g. size and/or quality of copy sheet, a number of copies, and so forth.

When the mouse related switch is turned off, the second printer icon display 163 makes display for further designation for the selected function when the selected function requires further designation by the user, such as designation of the position of staple or punch, size or ratio for the enlarged or reduced copy, size of sheet, and the set number of sheets. When the user makes the further designation, such as of the position of staple or punch, size or ratio for the enlarged or reduced copy, size of sheet, and the set number of sheets, the file data output unit 165 transfers to the image processing apparatus 30 data of the setting and designation of selected function, along with the file data.

Figure 11:
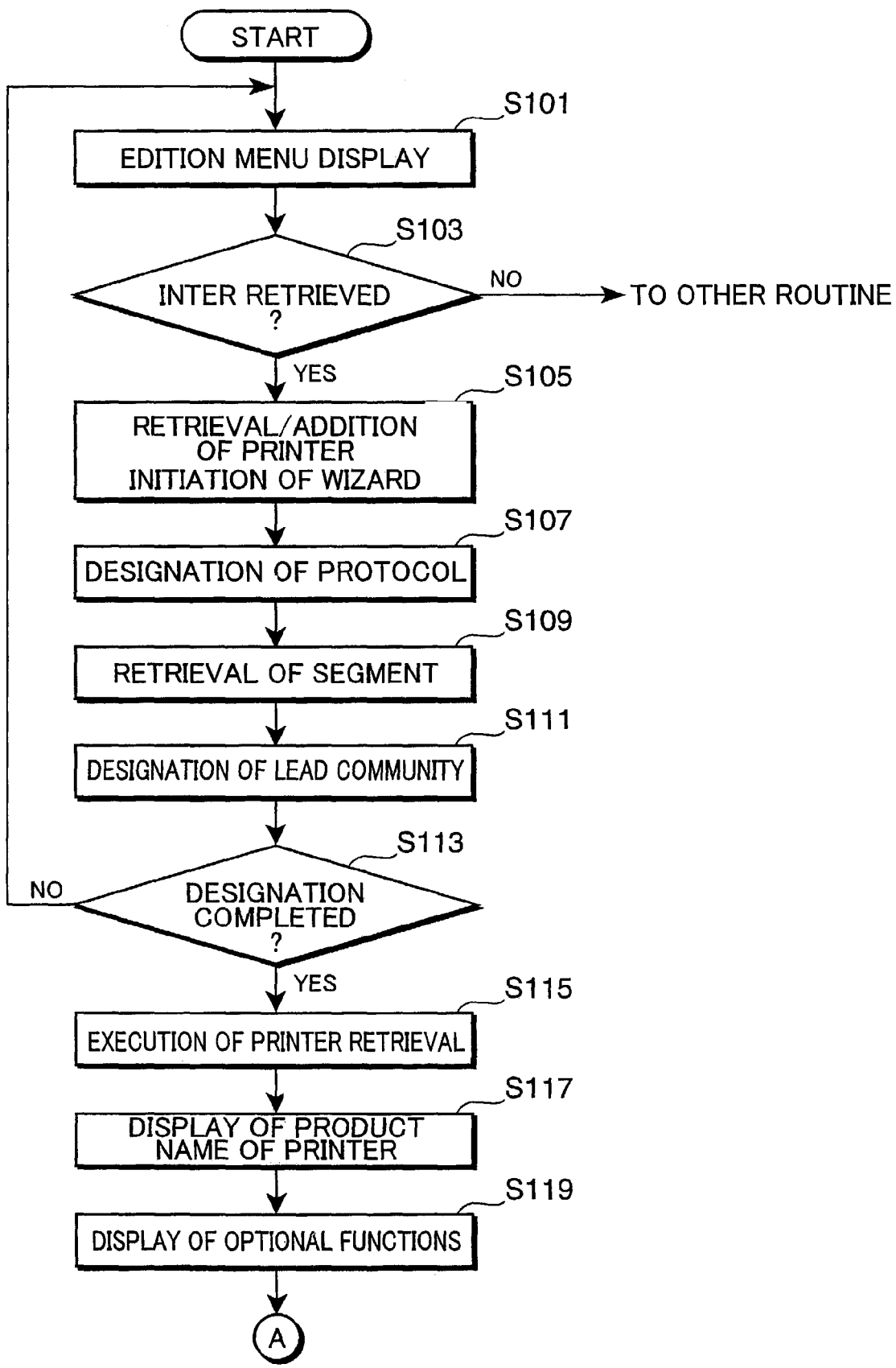
FIG. 11 is a flowchart showing the process of registering an image processing apparatus as a network printer in the second embodiment.
Figure 12:
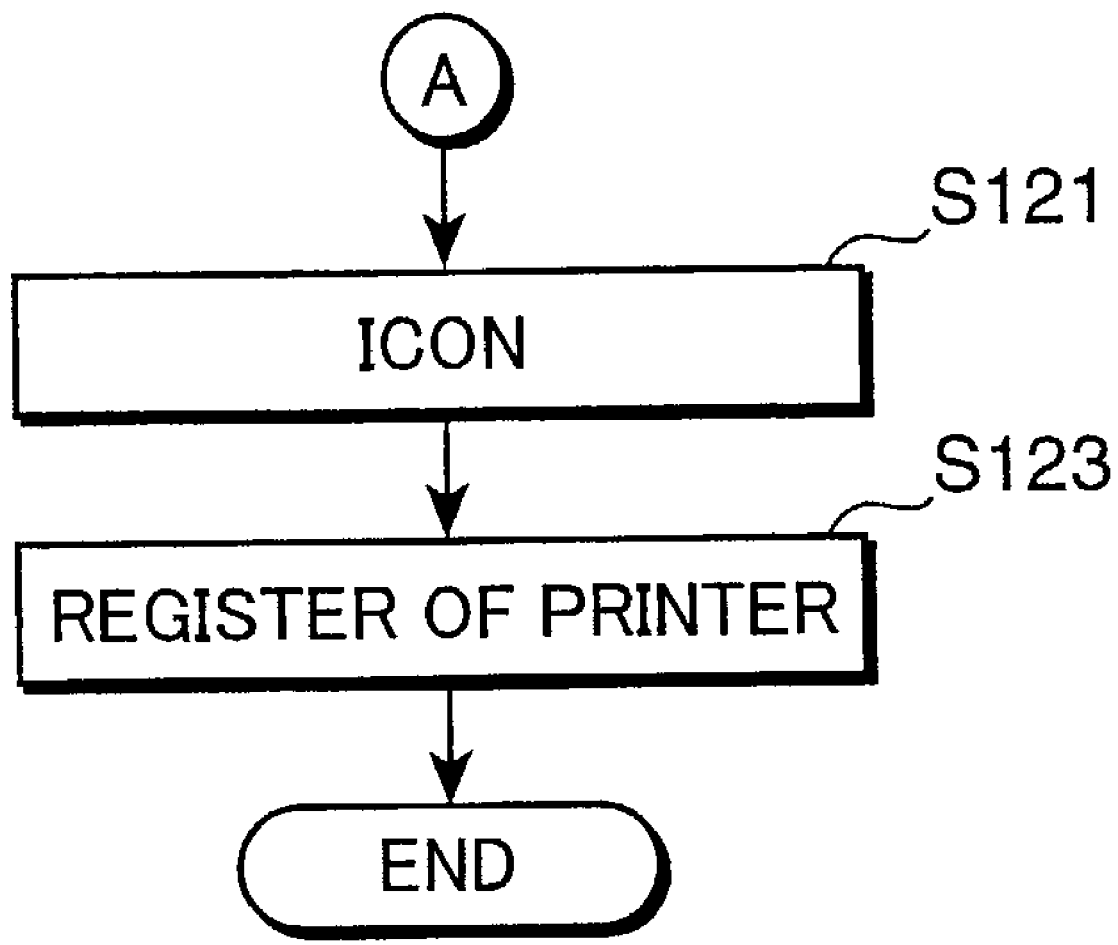
FIG. 12 is a continuation of the flowchart shown in FIG. 11.

Then, referring to the flowchart shown FIGS. 11 and 12, explanation will be made about the process of registering the image processing apparatus as a network printer.

First, CD-ROM 21 storing the printer driver and other program, is loaded in the CD drive of the personal computer. Then, the printer driver is initiated or started up and edition menu is displayer on the monitor screen 11. (Step S101). In order to register an image processing apparatus 30 as the network printer, the user move a pointer displayed on the monitor screen to select a network printer retrieving tag, and clicks a button of the mouse 12 or depresses a return key of keyboard 13 with the point being at the tag selecting position.

Then, in response to the signal from the input device such as the mouse or keyboard, the CPU of the personal computer 10 determine whether a printer retrieving has been selected in accordance with the signal from the input device. (Step S103) If a printer retrieving has been selected, a printer retrieving/adding wizard is activated. (Step 105) and the user proceeds with the printer retrieving process in accordance with the display on the screen. At that time, two choices "printer retrieving" and "printer addition" are displayed. Then, the user selects "printer retrieving."

Then the monitor screen 11 displays a protocol designating screen and the user selects either "IP/IPX", "IP" or "IPX" (Step S107) When a protocol is selected, the CPU retrieves a registered segment. (Step 109) If designation which allows change of subnet mask, is not designated, the registered segment is used as a set value. Further, the user designates a read-community. (Step S11) If the read-community is not designated, the read community is set as "public". Next, if the button for "Completion of Designation" is clicked on the monitor screen, the designation of conditions for the execution of printer retrieval is terminated. However, if a "Cancel" button is clicked, the flow returns to Step S101, and the designation can be made again.

When the designation is completed, CPU retrieves the name of kind or type, port, status, and IP address of the image processing apparatus 30. (Step S115) If the read-community is designated at Step S111, the retrieval is made only with respect to the image processing apparatus having the same read community name as the designated read community.

When the kind of the image processing apparatus 30 is retrieved, the monitor screen 11 displays an icon (a first printer icon) schematically showing the outer appearance of the image processing device, along with the retrieved information and explanation of the image processing apparatus. (Step S117) If the user moves the pointer to the portion of the monitor screen showing the type name of the image processing apparatus or the icon of the image processing apparatus, and he or she double-clicks the mouse button, the monitor screen 11 displays what options are provided in the image processing apparatus, an icon (a second printer icon) schematically showing the image processing apparatus equipped with the option, status condition, and IP address. (Step S119) With this display, the user can confirm the type and functions of the image processing apparatus 30 connected to the personal computer 10 via the network bus 20.

From the one or more of icons of image processing apparatus, the user may select one for the use as a printing apparatus, and drug the selected icon of an image processing apparatus (first or second printer icon) to a network group area shown on the left side of the monitor screen 11, and drop the icon in that area. (Step 121) If the user clicks a confirmation button shown on the monitor screen 11 after the selected icon of the image processing apparatus has been moved to the network group area, the image processing apparatus represented by the selected icon is used as a printer for the application soft activated in the personal computer 10. As the needs arise, the icon of the image processing apparatus (first or second printer icon) may be added in the task bar of the application software.

Figure 13:
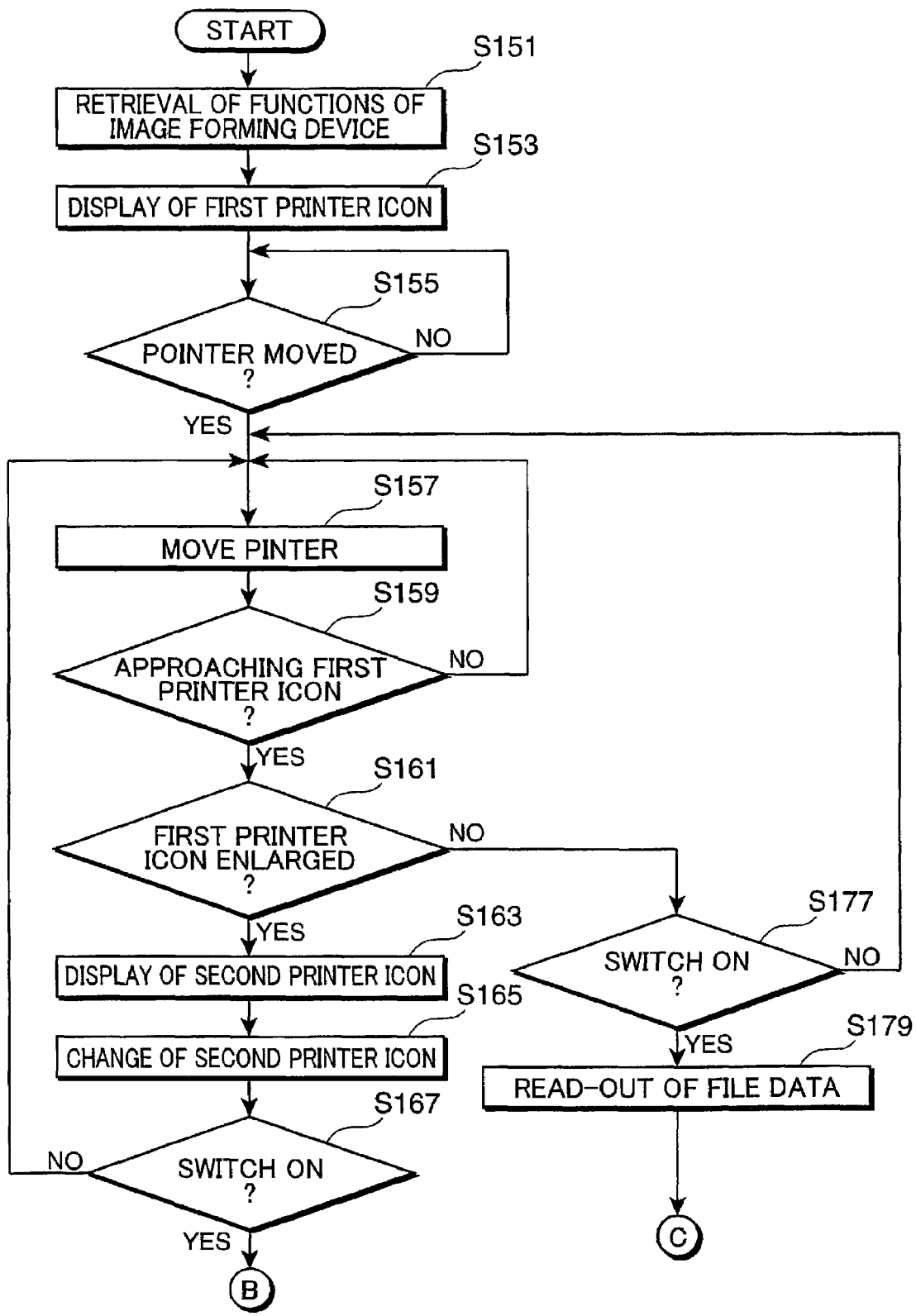
FIG. 13 is a flowchart showing the operation of the file data print output program according to the second embodiment.
Figure 14:
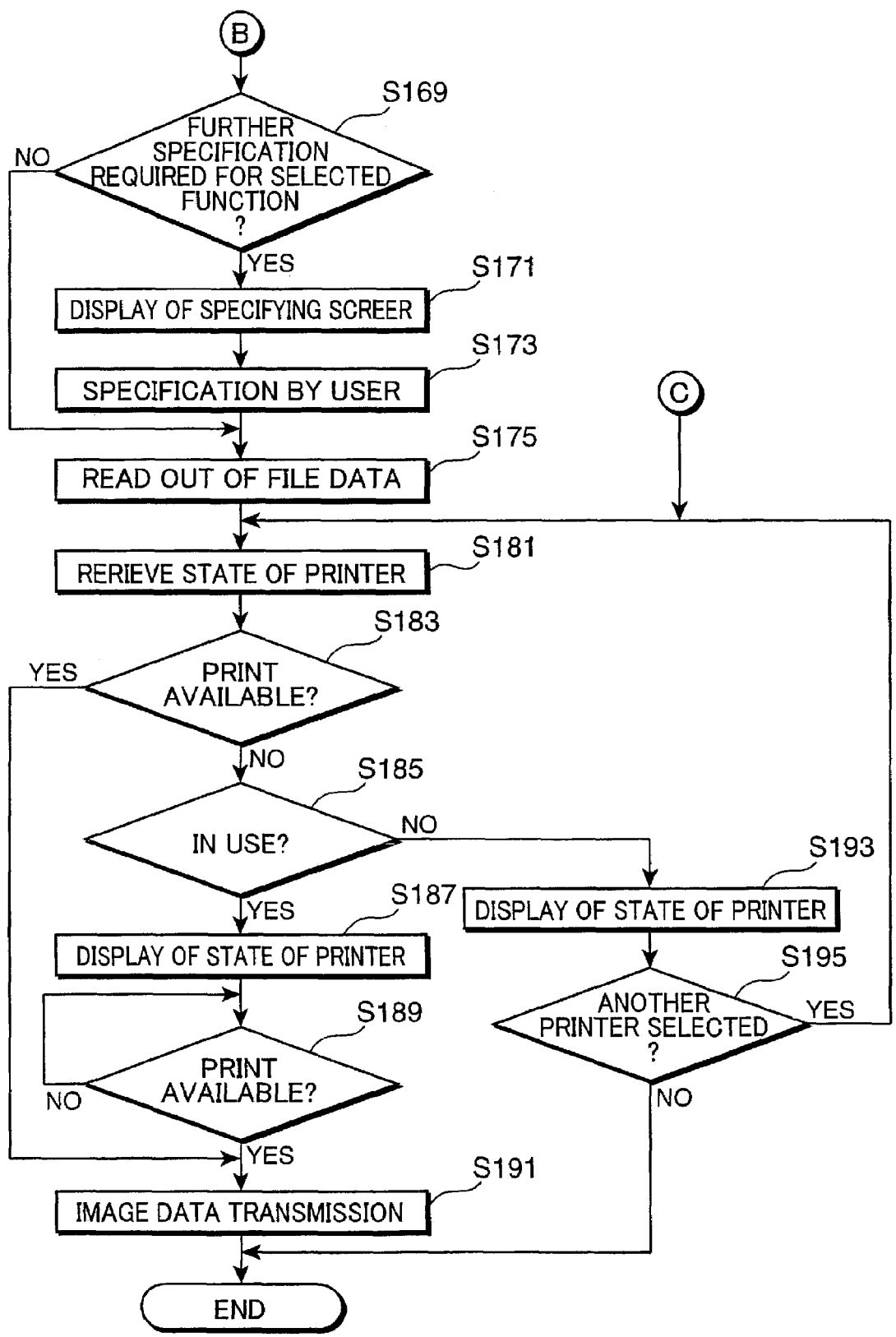
FIG. 14 is a continuation of the flowchart shown in FIG. 13.
Figure 15:
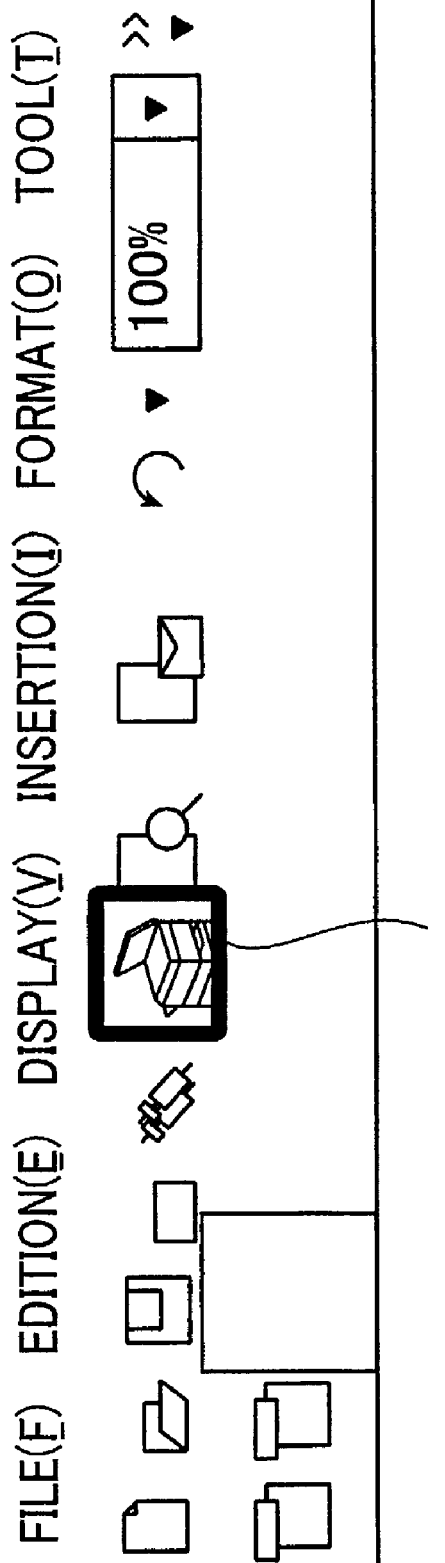
FIG. 15 shows an exemplary display of a first printer icon on a task bar according to an application software.

With reference to the flowcharts shown in FIGS. 13 and 14, and the illustration of screen display in FIG. 15 through 17, explanation will be made about the file data printing method and the operation of the program for that.

When the application software installed in the personal computer 10, is activated, the printer function retrieving unit 160 retrieves the functions of an image processing apparatus connected to the personal computer via the network bus and of which power switch has been turned on. The printer function retrieving unit 160 especially retrieves the functions to be optionally selected by the user. (Step 151) In accordance with the result of the retrieval by means of the printer function retrieving unit 160, the first printer icon display 162 selects an icon corresponding to the optional functions equipped in the image processing device and display the first printer icon 251 on the task bar shown on the monitor screen 11. (Step 153)

A pointer moving unit 166 determines whether the user is operating the input device. (Step S155) If the input device such as the mouse 12 is being operated, the pointer moving unit 166 displays a pointer 260 on the monitor screen 11 and moves the pointer in response to input signals. (Step S157)

The first printer icon display 162 and/or second printer icon display 163 determines whether the pointer approaches the first printer icon 251. (Step S159) If the pointer approaches the first printer icon 251, the first printer icon display 162 determines whether the first printer icon requires to be displayed in an enlarged form. (Step 161) If it is determined that the first printer icon requires to be displayed in an enlarged form, the printer icon display 163 displays, on the monitor screen 11, an enlarged second printer icon as shown in FIG. 16. (Step S163)

Figure 16:
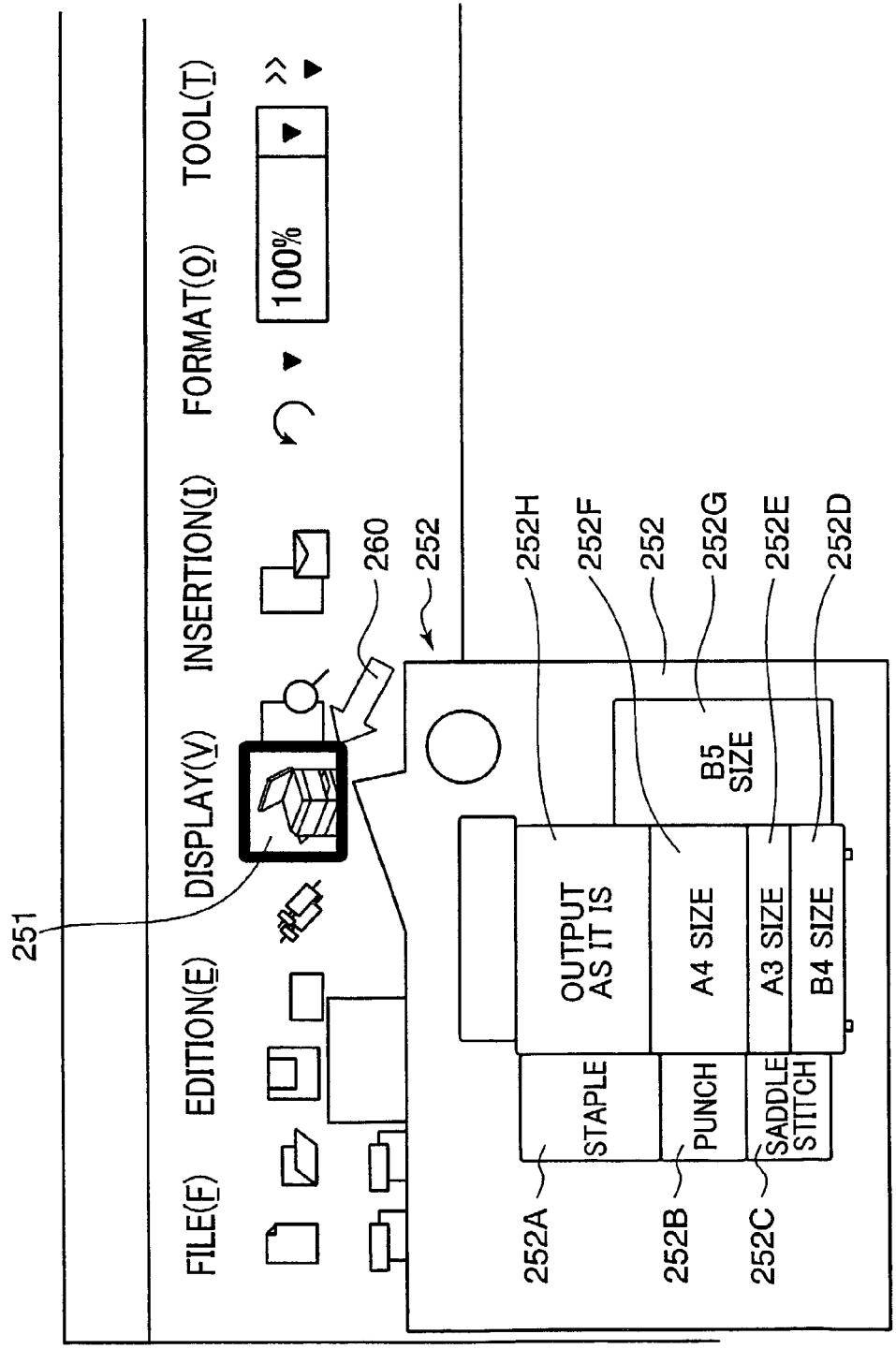
FIG. 16 shows an exemplary display of a second printer icon.
Figure 17:
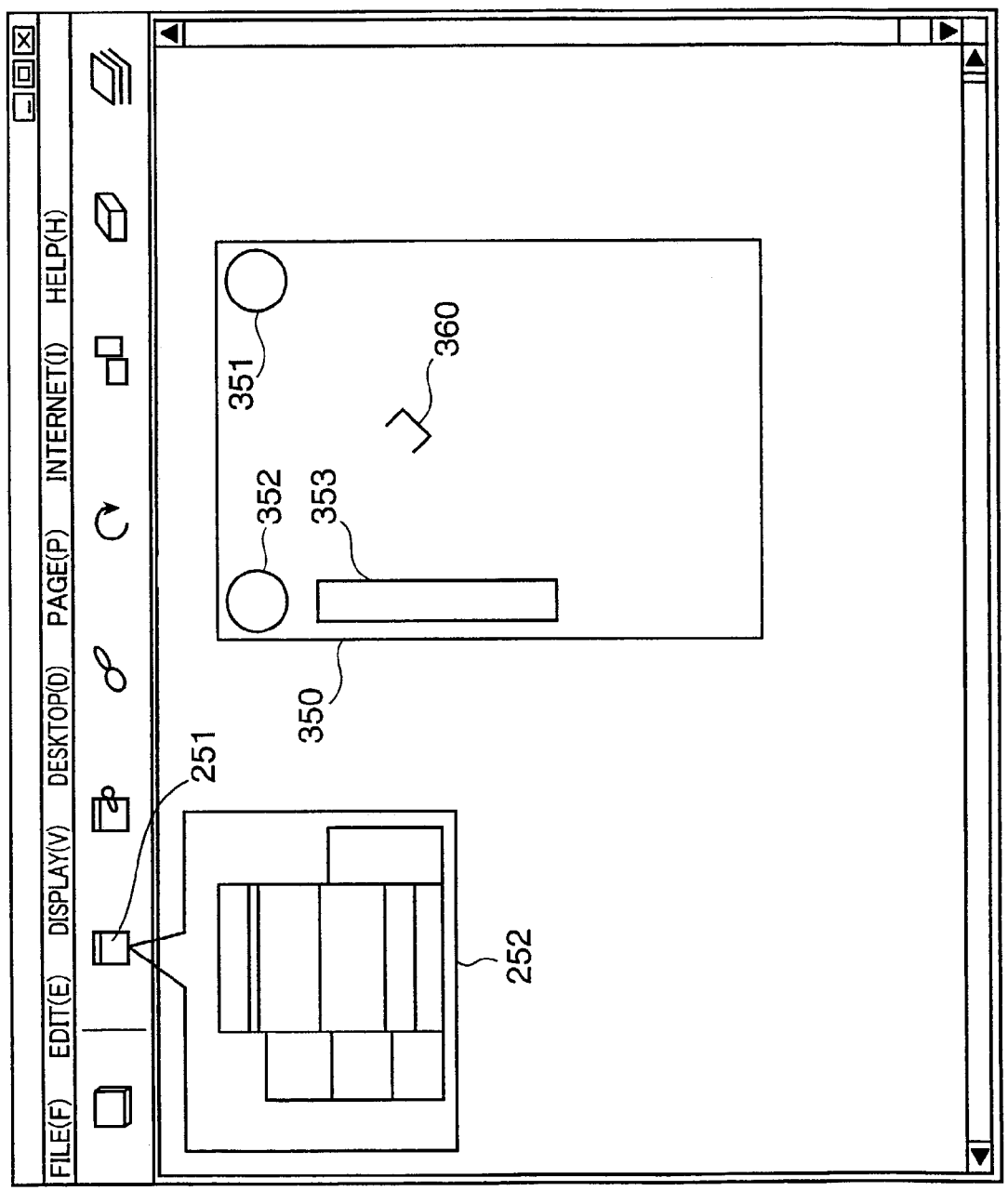
FIG. 17 shows an exemplary display of a staple designating screen.

As shown in FIG. 16, the second printer icon 252 is composed of a plurality of parts corresponding to optional functions equipped in the image processing apparatus. In the example shown in FIG. 16, the second printer icon is composed of optional function parts including a staple part 252A, a punch part 252, saddle stitching part 252C, sheet size selecting parts 252D through 252 G, in addition to the normal printing part 252H for making one copy for each page without stapling and the like.

The second printer icon display 163 and file data output unit 165 changes the appearance of the second printer icon 252 by changing the color of the part indicated by the tip of the pointer 260 in order that the user can easily recognize that part. (Step S165)

Next, the second printer icon display 163 and file data output unit 165 determine whether a switch associated with the button of the mouse (mouse associated switch) has been turned on or not, i.e., whether the user has select any functions displayed on the second printer icon 252. (Step S167) When the mouse associated switch is turned on, the second printer icon display 163 determines whether the function selected by the user requires further designation after the selection of the function, such as the designation of the position of staple or punch, size of sheet, size or ratio of enlargement or reduction, number of copy set. (Step S169)

If the further designation is required, the second printer icon display 163 displays, on a monitor screen, a screen for the further designation in accordance with the selected function. (Step S171) FIG. 17 shows, as an example, a screen for the designation of the position to be stapled. In the example shown in FIG. 17, a picture of copy sheet with indications of the candidate positions 351, 352, 353 and so forth, to be stapled such that the user may select any of the positions. At that time, the shape of the pointer 360 displayed on the monitor screen 11, is changed to the shape of a needle of a staple.

When the user has been designated the position of the staple or punch, the size or ratio of enlarged or reduced copy, size of copy sheet, and/or the number of copy set (Step S173), the file data output unit 165 read out a file data which is being edited, from the file data memory 164. (Step S175)

If the selected function does not require further designation at Step S169, the file data output unit 165 read out a file data which is being edited, from the file data memory 164. (Step S175)

If the first printer icon does not require to be displayed in enlarged form, the file data output unit 165 determines whether the mouse associated switch has been turned on or not. (Step S177) If the mouse associated switch has been turned on, the file data output unit 165 read out a file data which is being edited, from the file data memory 164. (Step S179)

In ordinary case, when the personal computer 10 transfers a file data to the image processing apparatus 30 via the network bus 20, the image processing apparatus 30 performs printing operation in accordance with the function or functions selected and designated by the user provided that the image processing apparatus has been energized to be ready for the printing operation. However, when the image processing apparatus can be used for multiple purposes such as in the case of digital copier, e.g. as a scanner, as a copier, or as a printer, it is possible that the image processing apparatus is being used by other person. When the image processing apparatus is used very frequently, it is likely to occur that the image processing apparatus does not work for the printing, because of shortage of toner, lack of toner, copy sheet jam, or out-of-order of the apparatus.

Accordingly, a printing condition retrieving unit 161 accesses CPU of the digital copier connected to the personal computer via the network bus 20, and retrieves the current condition of the image processing apparatus 30 (Step S47) to determine if print is available or not. (Step S181) If print is unavailable, the printing condition retrieving unit 161 determines if the designated digital copier is being under service or not. (Step S185) If it is determined that the image processing apparatus is being used, the first printer icon displays 162 or second printer icon display 163, indicates current status of the copier, i.e., that it is being used by another user, by, for example, superimposing, on the first or second printer icon, letters showing "under service", changing the color of the printer icon, or turning on and off the display of the printer icon. (Step S183) At that time, the personal computer waits until the copier become available condition. (Step S185)

In the case the image processing apparatus 30 is available at Step S183 or the image processing apparatus 30 becomes available at Step S189, the image data output unit 165 transfers, via the network bus 20 to the image processing apparatus 30, the image data read at Step S175 or S179 along with the data of the functions selected at Step S173, data regarding to designation or data set in advance, (Step S191) and terminates the flow.

In the case when the image processing apparatus 30 is not being used by other at Step S185, the printer icon display 162 displays, on the monitor screen 11, the current state of the copier, i.e., the state of our-of-order, for example, by superimposing, on the printer icon, letters showing "our-of-order" or other state, changing the color of the printer icon, or turning on and off the display of the printer icon. (Step S193) The state of the copier 30 to be indicated, may be either shortage of toner, lack of toner, sheet jam, lack of sheet, or out-f-order of the apparatus, and the display may be made in accordance with that state of the copier. Then, it is determined if the user selected other copier or image processing device. (Step S195) When another image processing apparatus has been selected, the flow returns to Step S81 and the flow as describe above is executed in connection with the newly selected copier or other image processing apparatus. If no other image processing apparatus has been selected, the flow is terminated at that stage.

As an example of color of the icon for the indication of various states of the copier 30, the color may be green for the indication that printing is available, yellow for the indication that print is available but finishing might be not satisfactory for example due to shortage of toner, and red for the indication that printing can not be made.

In the second embodiment described above, the first printer icon is displayed on the task bar. The program may be designed that the first printer icon is displayed by pulling up from an OS start menu.

As explained above, according to the file data printing method according to the embodiment, printing is made by making use of optional functions equipped by the image processing apparatus while the user indicates, by a pointer, the first printer icon displayed in a small figure on the task bar for the application software displayed on the monitor screen and pulls down the second printer icon for enlarged display. As the result, the user can selects the manner of printing of the file data, by selecting one or more of the functions by simple operation of user interface display on the monitor screen.

If the file data printing method further provided with a printer function retrieving step for retrieving functions of the image processing apparatus optionally selected by the user and storing the data of the retrieved functions in the memory of the personal computer at the time when the image processing apparatus is connected with the personal computer, the user may save time and trouble for manually setting the optional function on a new image processing apparatus which is newly introduced. If the optional function of the image processing apparatus is retrieved upon initiation of the personal computer, only one or more image processing apparatus and their functions available at that time may be displayed by icon or icons.

If the file data printing method further provided with a printer state retrieving step wherein the current status of the image processing apparatus is retrieved to change the appearance of the first or second printer icon in accordance with the retrieved printer state, the use may be visually informed of the current status of the image processing apparatus such as if printing is available or not, if the printer is being used by other and requires to wait, if the toner has run out, if the copy sheet has run out, if paper jam is occurring, if the printer is out-of-order, or if the finishing of the printed copy may be unsatisfactory because of shortage of toner.

If display is made of icons of a plurality of image processing apparatus connected to the personal computer via the network bus, the user may select any desired image processing apparatus from the candidates displayed by the icons.

If the shapes of the second printer icons of the image processing apparatus are varied in accordance with the kinds or types of image processing apparatus, the user can recognize the types and optional functions of the image processing apparatus simply by observing the printer icons.

When the first printer icon is displayed on the task bar displayed on the monitor screen, the user may select one or more functions of the image processing apparatus and select the manner of printing by simple operation on the conventional application software which is activated by the personal computer.

This application is based on patent application Nos. 2002-117157 and 2002-117158 filed in Japan, the contents of which are hereby incorporated by references.

Having described my invention as related to the embodiment shown in the accompanying drawing, it is my intention that the invention be not limited by any of the details of description, unless otherwise specified, but rather be construed broadly within its spirit and scope as set out in the accompanying claims.

What is claimed is:

1. A control system for an image processing apparatus wherein an image data, controlled by a terminal device having an input device, is outputted to an image processing apparatus having which has a plurality of functions optionally selectable by a user, and the image processing apparatus executes one of the plurality of functions selected by the user, the control system comprising:

a file icon display for displaying, on a monitor screen of the terminal device, file icons representing at least parts of image data files controlled by the terminal device;

a printer icon display for displaying, on the monitor screen, a single printer icon composed of a plurality of parts representative of the plurality of functions of the image processing apparatus, the parts being individually selectable by the user to effect execution of the correspond function by the image processing apparatus;

a pointer moving unit for moving a pointer on the monitor screen in response to user's operation on the input device of the terminal device;

a file icon moving unit for moving a file icon pointed by the pointer, following movement of the pointer when the pointer points the file icon out of file icons displayed on the monitor screen, and at the same time a switch of the input device is being turned on; and an image data output unit for outputting image data represented by the pointed file icon along with data of setting of the function corresponding to the part of the printer icon where the switch of the input device is turned off with the pointed file icon being overlapped with the part of the printer icon.

2. A control system for an image processing apparatus according to claim 1, wherein a plurality of terminal devices are connected with the image processing apparatus.

3. A control system for an image processing apparatus according to claim 1, further comprising a printer function retrieving unit for retrieving a function of the image processing apparatus optionally selectable by the user and storing data of the selected function in the terminal device at the time when the image processing apparatus is electrically connected with the terminal device.

4. A control system for an image processing apparatus according to claim 1, further comprising a printer state retrieving unit for retrieving a current state of the image processing apparatus, and wherein the printer icon display is arranged to change an appearance of the printer icon displayed on the monitor screen, in accordance with a retrieved state of the image processing apparatus.

5. A control system for an image processing apparatus according to claim 1, wherein the printer icon display is arranged to display a plurality of printer icons respectively representing the image processing apparatus connected to the terminal device via the network bus.

6. A control system for an image processing apparatus according to claim 5, wherein the printer icon display is arranged to display a plurality of printer icons in different shapes in accordance with kinds of the image processing apparatus.

7. A control system for an image processing apparatus according to claim 1, wherein the image processing apparatus includes a scanner function, and further comprising an image data control unit for transferring the data of image read by the image processing apparatus, to a terminal device designated by the user, and controlling the transferred image data as one of the image data files.

8. A control system for an image processing apparatus according to claim 7, wherein the file icon display is arranged to display, as the file icon, a thumbnail image of a first page of the image data file read by the image processing apparatus.

9. A control system for an image processing apparatus according to claim 1, wherein the function of the image processing apparatus to be optionally selected by the user, includes at least one of a sorting function, a duplex copy function, a stapling function, a punching function, a saddle stitch function, an enlarge/reduction copy function, and a sheet designation function.

10. A computer readable storage medium storing an executable program which configures a terminal device having an input device for controlling image data outputted to an image processing apparatus connected to the terminal device and which has a plurality of selectable functions optionally selectable by a user wherein the image processing apparatus executes one of the plurality of functions selected by the user, the executable program including portions configuring the terminal device to function as a device comprising:

a file icon display unit for displaying, on a monitor screen of the terminal device, a set of file icons which respectively represent at least a part of image data files controlled by the terminal device;

a printer icon display unit for displaying, on the monitor screen, a single printer icon composed of a plurality of parts representative of the plurality of selectable functions of the image processing apparatus; the parts being individually selectable by the user to effect execution of the correspond function by the image processing apparatus;

a pointer moving unit for moving a pointer on the monitor screen in accordance with operation of an input device of the terminal device;

a file icon moving unit for moving a file icon pointed by the pointer, following movement of the pointer when the pointer points the file icon out of file icons displayed on the monitor screen, and at the same time a switch of the input device is being turned on; and an image data output unit for outputting image data represented by the pointed file icon along with data of setting of the function corresponding to the part of the printer icon where the switch of the input device is turned off with the pointed file icon being overlapped with the part of the printer icon.

11. A method for controlling an image processing apparatus by means of a terminal device interconnected with the image processing apparatus, wherein the image processing apparatus has a plurality of functions optionally selectable by a user, and the image processing apparatus executes one of the plurality of functions selected by the user, the method comprising:

displaying, on a monitor screen of the terminal device, in a set, file icons of image data files controlled by the terminal device, each of the image data files being displayed at least in part, displaying a single printer icon composed of a plurality of parts representative of the plurality of functions of the image processing apparatus to be selected by a user, the parts being individually selectable by the user to effect execution of the correspond function by the image processing apparatus;

moving a pointer on the monitor screen of the terminal device in response to operation of an input device by the user;

moving a file icon pointed by the pointer, following movement of the pointer when the pointer points the file icon out of the file icons displayed on the monitor screen, and at the same time a switch of the input device is being turned on; and outputting, to the image processing apparatus, image data represented by the pointed file icon along with data of setting of the function corresponding to the part of the printer icon where the switch of the input device is turned off with the pointed file icon being overlapped with the part of the printer icon.

12. An image processing apparatus control system for outputting image data controlled by a terminal device having an input device, the image data being outputted to an image processing apparatus having a plurality of functions optionally selectable by a user, and for forming an image on a recording sheet in accordance executing one of the plurality of functions selected by the user, the control system comprising:

a first printer icon display unit for displaying a first printer icon on a monitor screen of the terminal device;

a pointer moving unit for moving a pointer on the monitor screen of the terminal device in response to operation of an input device by the user;

a second printer icon display unit for displaying a second printer icon by pulling-down from the first printer icon when the pointer points at the first printer icon displayed on the monitor screen, the second printer icon being composed of a plurality of parts representative of the functions of the image processing apparatus to be selected by the user; and a file data outputting unit for outputting, to the image processing apparatus, a file data which is being edited, and data of a function setting corresponding to the part of the second printer icon which is pointed at by die pointer with a switch of the input device being turned on.

13. An image processing apparatus control system according to claim 12, further comprising a printer function retrieving unit for retrieving functions of the image processing apparatus to be selected by the user and storing the data of the retrieved functions at the time when the image processing apparatus is connected with the terminal device.

14. An image processing apparatus control system according to claim 12, further comprising a printer state retrieving unit for retrieving a current state of the image processing apparatus and changing an appearance of the first or second printer icon in accordance with the retrieved state.

15. An image processing apparatus control system according to claim 12, wherein the first printer icon display unit is arranged to display icons respectively representing a plurality of image processing apparatus interconnected with the terminal device via a network bus.

16. An image processing apparatus control system according to claim 15, wherein the first printer icon display unit is arranged to display icons in different shapes in accordance with kinds of the image processing apparatus.

17. An image processing apparatus control system according to claim 12, wherein the first printer icon display unit is arranged to display the first printer icon on a task bar displayed on the monitor screen.

18. A computer readable storage medium storing an executable file data printing program to be used with an application program activated in a terminal device, for forming an image on a recording sheet in accordance with a function selected by the user, with a file data undergoing editing being transferred to an image processing apparatus having a plurality of functions to be optionally selected by the user, the image processing apparatus being configured to execute one of the plurality of functions selected by the user, the executable program including portions configuring the terminal device to function as a device comprising:

a first printer icon display unit for displaying a first printer icon on a monitor screen of the terminal device;

a pointer moving part for moving a pointer on the monitor screen of the terminal device in accordance with operation on an input device of the terminal device by the user;

a second printer icon display unit for displaying a second printer icon by pulling-down from the first printer icon when the pointer points at the first printer icon displayed on the monitor screen, the second printer icon being composed of a plurality of parts representative of the plurality of functions of the image processing apparatus, the parts being individually selectable by the user to effect execution of the correspond function by the image processing apparatus; and a file data outputting unit for outputting, to the image processing apparatus, the file data which is being edited, and data of a function setting corresponding to the part of the second printer icon which is painted at by the pointer with a switch of the input device being turned on.

* * * * *